US012102123B2

(12) United States Patent
Qiu

(10) Patent No.: US 12,102,123 B2
(45) Date of Patent: Oct. 1, 2024

(54) CARTRIDGE, LIQUID INJECTION METHOD, LIQUID INJECTION MECHANISM AND SEPARATING MECHANISM

(71) Applicant: CHANGZHOU PATENT ELECTRONIC TECHNOLOGY CO., LTD, Changzhou (CN)

(72) Inventor: Weihua Qiu, Jiangsu (CN)

(73) Assignee: CHANGZHOU PATENT ELECTRONIC TECHNOLOGY CO., LTD, Changzhou (CN)

(*) Notice: Subject to any disclaimer, the term of this patent is extended or adjusted under 35 U.S.C. 154(b) by 731 days.

(21) Appl. No.: 17/319,130

(22) Filed: May 13, 2021

(65) Prior Publication Data

US 2021/0259310 A1 Aug. 26, 2021

Related U.S. Application Data

(63) Continuation-in-part of application No. PCT/CN2019/114960, filed on Nov. 1, 2019.

(30) Foreign Application Priority Data

Nov. 13, 2018 (CN) ......................... 201811348502.8
Nov. 13, 2018 (CN) ......................... 201811349198.9
(Continued)

(51) Int. Cl.
*A24F 47/00* (2020.01)
*A24F 40/10* (2020.01)
(Continued)

(52) U.S. Cl.
CPC .............. *A24F 40/42* (2020.01); *A24F 40/10* (2020.01); *A24F 40/485* (2020.01); *A24F 40/70* (2020.01); *B67D 7/0288* (2013.01)

(58) Field of Classification Search
CPC ........ B65B 3/003; A24F 47/008; A24F 40/42; A24F 40/70; A24F 40/485
See application file for complete search history.

(56) References Cited

U.S. PATENT DOCUMENTS 10,279,934 B2 * 5/2019 Christensen .............. B65B 3/18
2004/0256026 A1 12/2004 Py
(Continued)

FOREIGN PATENT DOCUMENTS

CN 103750570 A 4/2014
CN 103750571 A 4/2014
(Continued)

OTHER PUBLICATIONS

Office Action with Search Report of Chinese Patent Application No. 201811349198.9 issued on Jan. 6, 2022.
(Continued)

*Primary Examiner* — Neil Abrams
(74) *Attorney, Agent, or Firm* — Andrew C. Cheng

(57) ABSTRACT

A cartridge includes a cartridge housing, an atomizing head, and a sealing member. A liquid storage cavity for storing e-liquid is formed inside the cartridge housing. The atomizing head is located at one end of the cartridge housing, and the sealing member is located at the other end of the cartridge housing opposite to the atomizing head. The atomizing head is in communication with the liquid storage cavity and the outside. When a liquid injection needle is used to inject liquid into the cartridge, the liquid injection needle pierces the sealing member and extends into the cartridge housing to inject e-liquid into the liquid storage cavity. The air in the liquid storage cavity is discharged out through the end of the cartridge housing with the atomizing head. After the liquid injection needle is pulled out, the sealing member will form a self-sealing at the pierced position.

3 Claims, 25 Drawing Sheets

(30) Foreign Application Priority Data

Nov. 13, 2018 (CN) ......................... 201821870546.2
Nov. 13, 2018 (CN) ......................... 201821870599.4

(51) Int. Cl.

| | |
|---|---|
| ***A24F 40/42*** | (2020.01) |
| ***A24F 40/485*** | (2020.01) |
| ***A24F 40/70*** | (2020.01) |
| ***B67D 7/02*** | (2010.01) |

(56) References Cited

U.S. PATENT DOCUMENTS

| | | | | |
|---|---|---|---|---|
| 2014/0209108 | A1 | 7/2014 | Li et al. | |
| 2015/0289565 | A1 | 10/2015 | Cadieux et al. | |
| 2017/0121169 | A1* | 5/2017 | Dailey | B65B 57/145 |
| 2017/0233114 | A1 | 8/2017 | Christensen et al. | |
| 2018/0022516 | A1 | 1/2018 | Liu | |
| 2021/0259310 | A1* | 8/2021 | Qiu | A24F 40/485 |

FOREIGN PATENT DOCUMENTS

| | | | |
|---|---|---|---|
| CN | 204393354 | U | 6/2015 |
| CN | 204777490 | U | 11/2015 |
| CN | 204994614 | U | 1/2016 |
| CN | 105752911 | A | 7/2016 |
| CN | 106542305 | A | 3/2017 |
| CN | 207678853 | U | 8/2018 |
| CN | 207940346 | U | 10/2018 |
| CN | 209219272 | U | 8/2019 |
| CN | 209420954 | U | 9/2019 |
| CN | 209518262 | U | 10/2019 |
| CN | 111184264 | A | 5/2020 |
| EP | 3158880 | A1 | 4/2017 |

OTHER PUBLICATIONS

The extended European search report of EP application No. 19886016.5 issued on Jun. 21, 2022.
International Search Report of PCT Patent Application No. PCT/CN2019/114960 issued on Feb. 5, 2020.
Office Action with Search Report of Chinese Patent Application No. 201811349198.9 issued on Apr. 2, 2021.

* cited by examiner

CARTRIDGE, LIQUID INJECTION METHOD, LIQUID INJECTION MECHANISM AND SEPARATING MECHANISM

CROSS-REFERENCE TO RELATED APPLICATIONS

This application is a continuation-in-part of International patent application No. PCT/CN2019/114960, filed on Nov. 1, 2019, which claims priority to Chinese patent applications Nos. 201821870599.4, 201811348502.8, 201811349198.9 and 201821870546.2, filed on Nov. 13, 2018. The aforementioned applications are hereby incorporated by reference in their entireties.

TECHNICAL FIELD

The present disclosure relates to the technical field of electronic cigarette, and more particularly, relates to a cartridge for an electronic cigarette, an electronic cigarette and its liquid injection method, a liquid injection mechanism, a separating mechanism, and a liquid injection device.

BACKGROUND

At present, the electronic cigarette has become a relatively mature alternative to replace tobacco in the market. It uses the battery to supply power to the heating member in the atomizing head to heat the e-liquid absorbed on the liquid guiding member to generate smoke, so that the user can obtain a smoking experience.

Currently, there are two types of cartridge for electronic cigarettes on the market. The first type is the cartridge that does not include an atomizing head, the second type is the cartridge that includes an atomizing head. For the second type of cartridge, this type of cartridge is prone to liquid leakage when assembling the atomizing head after the e-liquid is filled.

SUMMARY

In view of the existing shortcomings, an object of the present disclosure is to provide a cartridge for an electronic cigarette to avoid liquid leakage when injecting e-liquid, and further provide an electronic cigarette.

The present disclosure provides a cartridge for an electronic cigarette. The cartridge includes a cartridge housing, an atomizing head and a sealing member, wherein:

- a liquid storage cavity for storing e-liquid is formed inside the cartridge housing;
- the atomizing head is located at one end of the cartridge housing, the sealing member is located at the other end of the cartridge housing opposite to the atomizing head;
- the atomizing head is in communication with the liquid storage cavity and the outside;
- when a liquid injection needle is used to inject liquid into the cartridge, the liquid injection needle pierces the sealing member and extends into the cartridge housing to inject e-liquid into the liquid storage cavity, the air in the liquid storage cavity is discharged out through the end of the cartridge housing with the atomizing head, and after the liquid injection needle is pulled out, the sealing member forms a self-sealing at the pierced position.

Further, the sealing member is made of rubber, silicone or self-healing material.

Further, the cartridge further includes a vent pipe, the sealing member is provided with a smoke outlet hole, the vent pipe is received in the cartridge housing, one end of the vent pipe is connected to the sealing member and is in communication with the smoke outlet hole, the other end of the vent pipe is connected to and in communication with the atomizing head.

Further, the cartridge further includes a top cover, the top cover is arranged on the end of the cartridge housing with the sealing member, the top cover is provided with a smoke outlet opening in communication with the smoke outlet hole.

Further, the top cover and the sealing member are spaced apart, an inner side of a top wall of the top cover is provided with a guiding portion corresponding to the smoke outlet hole; there is a gap formed between the guiding portion and the sealing member; wherein the smoke outlet hole, the gap between the guiding portion and the sealing member, an inner cavity of the top cover and the smoke outlet opening are in communication with each other in sequence.

Further, the sealing member is provided with a blind hole on each of two sides of the smoke outlet hole, the blind hole is configured to reduce a thickness of the sealing member at the pierced position.

Further, the atomizing head includes a heating device and a fixing bracket, the heating device is installed on the fixed bracket; the heating device includes a liquid absorbing member and a heating member for use with the liquid absorbing member; the liquid absorbing member is in communication with the liquid storage cavity and an inner cavity of the fixing bracket; the liquid absorbing member is configured to absorb the e-liquid in the liquid storage cavity, the heating member is located in the inner cavity of the fixing bracket, the heating member is configured to heat and atomize the e-liquid absorbed by the liquid absorbing member.

Further, the end of the cartridge housing with the atomizing head is provided with a bottom base; the atomizing head is installed on the bottom base of the cartridge housing through the fixing bracket, the bottom base of the cartridge housing is provided with an air inlet hole, the air inlet hole is in communication with the inner cavity of the fixing bracket and the outside.

Further, two opposite side walls of a lower part of the fixing bracket are each provided with a mounting hole with an opening facing downward, two ends of the liquid absorbing member are embedded in the mounting holes; the bottom base is provided with a latching seat extending toward an inside of the cartridge housing, the latching seat is provided with a latching slot with an opening facing upwards; the fixing bracket is installed on the latching seat and is attached to the latching seat; the latching slot matches with the mounting hole of the fixing bracket, the two ends of the liquid absorbing member are also clamped in the latching slot.

Further, the atomizing head further includes two electrode contacts, two ends of the heating member are electrically connected to the two electrode contacts respectively; the bottom base of the cartridge housing is provided with two through slots corresponding to the two electrode contacts, one end of each electrode contact away from the heating member extends through a corresponding through slot and then is bent.

The present disclosure further provides an electronic cigarette. The electronic cigarette includes a battery assembly and a cartridge mentioned above, wherein the cartridge is electrically connected to the battery assembly.

The beneficial effects of the present disclosure are: when the cartridge is injected through the liquid injection needle, the liquid injection needle pierces the sealing member and extends into the cartridge housing to inject e-liquid into the liquid storage cavity, and the air in the liquid storage cavity is discharged out through the end of the cartridge housing with the atomizing head. After the liquid injection needle is pulled out, the sealing member forms a self-sealing at the pierced position; therefore, there will be no leakage when filling the e-liquid.

In view of the existing shortcomings, an object of the present disclosure is to provide a liquid injection method for a cartridge and a liquid injection mechanism for implementing the liquid injection method, to avoid liquid leakage when injecting the e-liquid, reduce the difficulty of liquid injection into the cartridge, and improve the production efficiency.

The present disclosure provides a liquid injection method for injecting liquid into a cartridge, wherein the cartridge includes a cartridge housing, an atomizing head and a sealing member; a liquid storage cavity for storing e-liquid is formed inside the cartridge housing; the atomizing head is arranged at a lower end of the cartridge housing, the sealing member is arranged at an upper end of the cartridge housing opposite to the atomizing head; the atomizing head is in communication with the liquid storage cavity and the outside; wherein the liquid injection method includes:

inverting the cartridge;

using a liquid injection needle to pierce the sealing member of the cartridge and extend into the cartridge housing to inject e-liquid into the liquid storage cavity of the cartridge; and after the liquid injection is completed, pulling out the liquid injection needle, and the sealing member forming a self-sealing at the pierced position.

Further, the mass of one end of the cartridge with the sealing member is greater than the mass of the other end with the atomizing head, the cartridge is inverted by means of vibration.

Further, the liquid injection method further includes:

after the cartridge is inverted, the cartridge is conveyed and fed towards the position of the liquid injection needle by means of vibration;

during conveying and feeding, a plurality of cartridges abutting against with each other at the front end are separated so that the plurality of cartridges are separated from each other; and the plurality of cartridges having been separated from each other are gripped and transferred to the liquid injection position, to cause the plurality of cartridges to be aligned with a plurality of liquid injection needles respectively, so that the plurality of liquid injection needles are used to inject e-liquid into the plurality of cartridges respectively.

Further, the liquid injection method further includes:

the plurality of cartridges having been separated from each other are gripped and transferred to a conveying fixture for placement; and the conveying fixture with the plurality of cartridges are transferred to the liquid injection position.

Further, the liquid injection method further includes:

the plurality of cartridges after liquid injection are taken out from the conveying fixture to realize the collecting of the plurality of cartridges.

Further, the liquid injection method further includes:

the plurality of cartridges after liquid injection are taken out from the conveying fixture and then placed in an empty collecting fixture.

Further, the liquid injection needle is driven to move up to pierce the sealing member of the cartridge and extend into the cartridge housing.

The present disclosure further provides a liquid injection mechanism for implementing the liquid injection method as mention above, wherein the liquid injection mechanism is configured to inject liquid into a cartridge, the cartridge includes a cartridge housing, an atomizing head and a sealing member; a liquid storage cavity for storing e-liquid is formed inside the cartridge housing; the atomizing head is arranged at a lower end of the cartridge housing, the sealing member is arranged at an upper end of the cartridge housing opposite to the atomizing head; the atomizing head is in communication with the liquid storage cavity and the outside, wherein:

the liquid injection mechanism includes a plurality of liquid injection needles, a plurality of liquid injection pumps and a driving cylinder;

each liquid injection needle is correspondingly connected with a liquid injection pump; and the driving cylinder is configured to drive the plurality of liquid injection needles to move upwards, to cause the liquid injection needle to pierce the sealing member of the cartridge and extend into the liquid storage cavity to inject e-liquid into the liquid storage cavity.

Further, the liquid injection mechanism further includes a guiding plate, a fixing plate and a locking plate; the guiding plate, the fixing plate and the locking plate are arranged in sequence from top to bottom, the guiding plate is configured to position the plurality of liquid injection needles, the fixing plate is configured to fix the plurality of liquid injection needles; the driving cylinder drives the guiding plate, the fixing plate and the locking plate to move upwards, so that the plurality of liquid injection needles are driven to move upwards.

Further, when the liquid injection needle moves upward, the liquid injection needle pierces the sealing member on the cartridge and extends into the liquid storage cavity; when the liquid injection needle moves downward, the liquid injection needle is pulled out from the cartridge.

In the liquid injection method for injecting liquid into the cartridge, the cartridge is inverted in order to inject the liquid, the liquid injection needle pierces the sealing member and extends into the cartridge housing to inject the e-liquid into the liquid storage cavity, and the air in the liquid storage cavity is discharged out through the end of the cartridge housing with the atomizing head, so that the air pressure in the liquid storage cavity is balanced. After the liquid injection needle is pulled out, the sealing member will form a self-sealing at the pierced position, so there will be no liquid leakage when the liquid is filled, thereby reducing the difficulty of liquid injection into the cartridge and improving the efficiency of liquid injection.

In the liquid injection mechanism for implementing the liquid injection method, the plurality of liquid injection needles move upward, so that the liquid injection needle pierces the sealing member on the cartridge and extends into the liquid storage cavity to fill the liquid storage cavity with e-liquid. Therefore, the liquid will not leak when filling the e-liquid, thereby reducing the difficulty of liquid filling into the cartridge and improving the production efficiency.

In view of the existing shortcomings, an object of the present disclosure is to provide a separating mechanism to separate a plurality of cartridges that abut against each other.

The present disclosure provides a separating mechanism for separating a plurality of cartridges abutting against with each other, the separating mechanism includes a limiting groove, a limiting cylinder, an abutting cylinder and a separating cylinder, wherein:

- a side wall of the limiting groove is provided with a notch near an entrance end of the limiting groove;
- the limiting cylinder is connected with an abutting head corresponding to the notch;
- an abutting block is connected to the abutting cylinder, the abutting block is corresponding to a front end of the limiting groove; and
- the separating cylinder is located under the limiting groove, and the separating cylinder is connected with a plurality of separating rods, the plurality of separating rods are configured for inserting between adjacent cartridges to separate the plurality of cartridges from each other.

Further, when the cartridges are fed to the limiting groove, the limiting cylinder drives the abutting head to retract, the cartridges being fed enter into the limiting groove, the abutting cylinder drives the abutting block to extend into the limiting groove, the abutting block abuts against a cartridge that is positioned at the foremost position in the limiting groove, the abutting block is configured to control the number of the cartridges fed into the limiting groove; when a predetermined number of the cartridges are fed in the limiting groove, the limiting cylinder drives the abutting head to extend out, the abutting head passes through the notch and abuts against the cartridge that is located closest to the entrance end of the limiting groove, and the abutting cylinder drives the abutting block to retract; when separating the cartridges, the separating cylinder drives the plurality of separating rods to move up, the plurality of separating rods are respectively squeezed and inserted between adjacent cartridges from bottom to top to separate the cartridges in the limiting groove from each other.

Further, the separating mechanism further includes a pressing cylinder, and the pressing cylinder is connected with a pressing plate; when the cartridges are fed into the limiting groove and the cartridges in the limiting groove are separated by the plurality of separating rods, the pressing cylinder drives the pressing plate to move to directly above the limiting groove to confine the cartridges in the limiting groove; after the cartridges are separated by the plurality of separating rods in the limiting groove, the pressing cylinder drives the pressing plate to move away from directly above the limiting groove.

Further, the limiting cylinder is perpendicular to the side wall of the limiting groove and is arranged horizontally; the abutting cylinder is arranged on an extension line of the limiting groove and is arranged horizontally; the separating cylinder is perpendicular to a bottom wall of the limiting groove and is arranged vertically.

Further, the number of the separating rods is less than the number of the cartridges entering the limiting groove by one.

Further, the separating cylinder further includes a connecting block and an adjusting plate, the plurality of separating rods are fixed on the adjusting plate; the adjusting plate is connected to the connecting block, and can adjust the relative position of the connecting block along a vertical direction to adjust a depth of the separating rods inserted into the limiting groove.

Further, the separating mechanism further includes a third sensor, the third sensor is arranged outside the front end of the limiting groove, the third sensor is directly facing a virtual position at the front end of the limiting groove; when the third sensor detects that there is a cartridge at the virtual position, it is determined that the cartridges are fed into the limiting groove.

Further, when the abutting cylinder drives the abutting block to extend into the limiting groove to control the number of the cartridges fed into the limiting groove, the virtual position is located at the position of the cartridge which abuts against the abutting block.

In the separating mechanism, the separating cylinder is located under the limiting groove, the separating cylinder is connected with the plurality of separating rods configured for inserting between adjacent cartridges to separate the plurality of cartridges from each other, the operation is simple.

In view of the existing shortcomings, an object of the present disclosure is to provide a liquid injection device to avoid liquid leakage when injecting e-liquid, reduce the difficulty of liquid injection of the cartridge, and improve production efficiency.

The present disclosure provides a liquid injection device for injecting liquid into a cartridge of an electronic cigarette, the cartridge includes a cartridge housing, an atomizing head and a sealing member; a liquid storage cavity for storing e-liquid is formed inside the cartridge housing; the atomizing head is arranged at a lower end of the cartridge housing; the sealing member is arranged at an upper end of the cartridge housing opposite to the atomizing head; the atomizing head is in communication with the liquid storage cavity and the outside; wherein the liquid injection device includes:

- a vibrating and feeding mechanism configured for sorting the cartridges into an inverted state by means of vibration and then conveying and feeding the cartridges;
- a liquid injection mechanism configured for driving a liquid injection needle to pierce the sealing member of the cartridge and extend into the cartridge housing to inject e-liquid into the liquid storage cavity of the cartridge; wherein after the liquid injection is completed, the liquid injection mechanism is further configured for driving the liquid injection needle to be pulled out of the cartridge, and after the liquid injection needle is pulled out, the sealing member forms a self-sealing at the pierced position.

Further, the liquid injection mechanism further includes:

- a separating mechanism configured for receiving the cartridges being conveyed and fed, and separating a plurality of cartridges that are located at the front end and abut against with each other, so that the plurality of cartridges are separated from each other;
- a gripping and transferring mechanism configured for gripping and transferring the plurality of cartridges having been separated from each other to be loaded on a conveying fixture of a conveying mechanism;
- the conveying mechanism configured for conveying the conveying fixture loaded with the plurality of cartridges to a position where the liquid injection mechanism is located, wherein the plurality of cartridges are respectively corresponding to a plurality of liquid injection needles provided on the liquid injection mechanism, so that the plurality of liquid injection needles are used to respectively inject liquid into the plurality of cartridges; and
- a collecting mechanism configured for taking out the plurality of cartridges having been filled with liquid from the conveying fixture of the conveying mechanism to realize the collecting of the plurality of cartridges.

Further, the vibrating and feeding mechanism includes a circular vibration, a first straight vibration and a first sensor; a front end of the circular vibration is connected to the first straight vibration; the first sensor is configured to detect whether there is a shortage of material in the first straight vibration; the cartridges are sorted into an inverted state and sent to the first straight vibration by the circular vibration, and the cartridges are arranged regularly and conveyed and fed by the first straight vibration; wherein when the cartridge is in an inverted state, the sealing member of the cartridge is on the bottom and the atomizing head is on the top.

Further, the vibrating and feeding mechanism further includes a material storage bin, a second straight vibration, and a second sensor; the second straight vibration is located under the material storage bin; the second straight vibration is configured to feed the cartridges in the material storage bin to the circular vibration; the second sensor is located above the circular vibration, the second sensor is configured to detect whether there is a shortage of material in the circular vibration.

Further, the separating mechanism includes a limiting groove, a limiting cylinder, an abutting cylinder and a separating cylinder; an entrance end of the limiting groove is connected with the vibrating and feeding mechanism; a side wall of the limiting groove is provided with a notch near the entrance end of the limiting groove; the limiting cylinder is connected with an abutting head corresponding to the notch; an abutting block is connected to the abutting cylinder, the abutting block is corresponding to a front end of the limiting groove; the separating cylinder is located under the limiting groove, and the separating cylinder is connected with a plurality of separating rods.

Further, the gripping and transferring mechanism includes a first transverse cylinder, a first transverse rail, a first vertical cylinder and a first pneumatic gripper; the first transverse cylinder is configured to drive the first vertical cylinder to move along the first transverse rail; the first vertical cylinder is configured to drive the first pneumatic gripper to move vertically; the first pneumatic gripper is configured to drive a first clamping member; the first clamping member is configured to clamp the cartridges from the separating mechanism.

Further, the conveying mechanism includes the conveying fixture, a conveying cylinder and a guide rail; the conveying cylinder is configured to drive the conveying fixture to move along the guide rail; a plurality of grooves for placing the cartridges are provided in the conveying fixture, the gripping and transferring mechanism conveys and places the clamped cartridges into the grooves of the conveying fixture; the conveying cylinder conveys the conveying fixture to the liquid injection mechanism for liquid injection.

Further, the liquid injection mechanism includes a plurality of liquid injection needles, a plurality of liquid injection pumps and a driving cylinder; the driving cylinder is configured to drive the plurality of liquid injection needles to move up and down, to cause the liquid injection needle to pierce the sealing member of the cartridge and extend into the liquid storage cavity to inject e-liquid into the liquid storage cavity.

Further, the collecting mechanism includes a second transverse cylinder, a second transverse rail, a second vertical cylinder and a second pneumatic gripper; the second transverse cylinder is configured to drive the second vertical cylinder to move along the second transverse rail; the second vertical cylinder is configured to drive the second pneumatic gripper to move vertically; the second pneumatic gripper is configured to drive a second clamping member to clamp the cartridges from the conveying fixture.

Further, the collecting mechanism further includes a limiting plate, the limiting plate is located above the conveying fixture; during liquid injection, the limiting plate abuts against the cartridges in the conveying fixture to prevent the cartridges from moving axially.

In the liquid injection device, the vibrating and feeding mechanism sorts the cartridges into an inverted state by vibration and then conveys and feeds the cartridges, the liquid injection mechanism drives the liquid injection needle to pierce the sealing member of the cartridge and extend into the cartridge housing to inject e-liquid into the liquid storage cavity of the cartridge. Therefore, the liquid will not leak when injecting the e-liquid, thereby reducing the difficulty of liquid injection into the cartridge and improving the production efficiency.

DETAILED DESCRIPTION OF PREFERRED EMBODIMENTS

Figure 1:
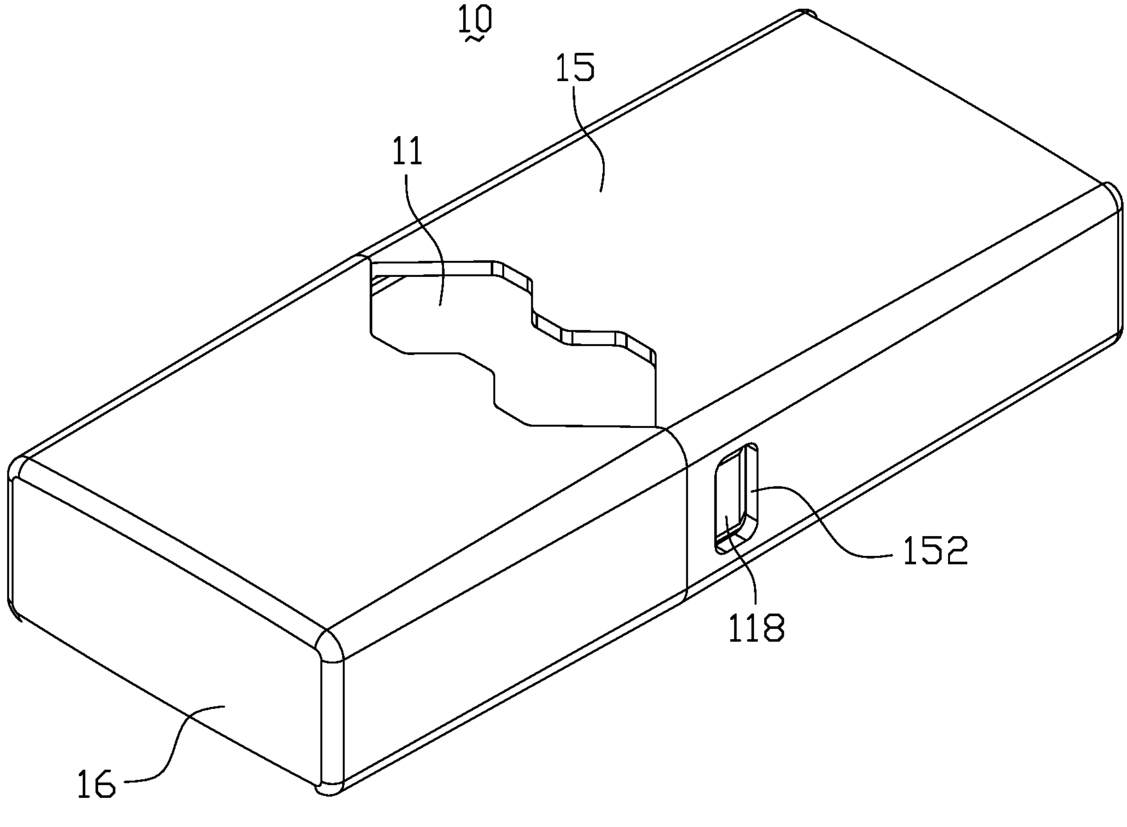
FIG. 1 is an isometric view of a cartridge of an electronic cigarette in an embodiment of the present disclosure.
Figure 2:
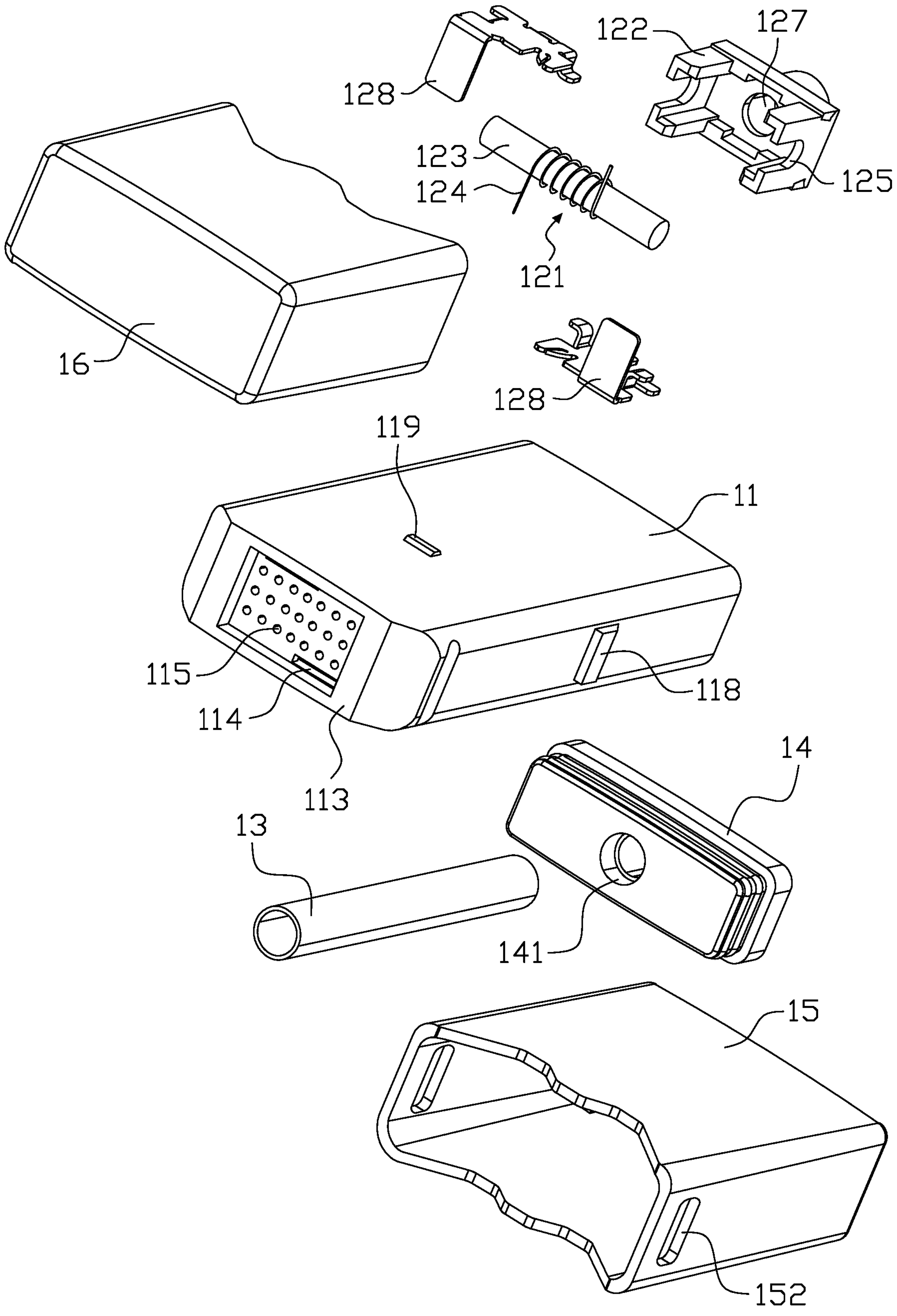
FIG. 2 is an exploded view of the cartridge shown in FIG. 1.

In order to make the technical means, features, objects and effects of the present disclosure easy to understand, the present disclosure is further described in combination with the specific embodiments.

It should be noted that when an element is referred to as being "fixed" or "connected" to another element, it may be directly fixed or connected to another element, or there may be an intervening element. When an element is considered to be "connected" to another element, it can be directly connected to the other element or intervening elements may also be present.

In this description, the orientation words such as "up", "down", "left", "right", "front", "back" or the like are defined by the positions of the structures and the positions between the structures in the figure, just for the clarity and convenience of description of the technical solution. It should be understood that the use of the orientation words should not limit the protection scope of the present disclosure.

First Embodiment

Please refer to FIGS. 1 to 8, in the first embodiment of the present disclosure, a cartridge 10 for storing e-liquid is provided, which is suitable for use in an electronic cigarette. The cartridge 10 includes a cartridge housing 11, an atomizing head 12, a vent pipe 13 and a sealing member 14. The atomizing head 12 is arranged at the lower end of the cartridge housing 11. The sealing member 14 is sealed and arranged on the upper end of the cartridge housing 11. A smoke outlet hole 141 is provided in the middle of the sealing member 14. The vent pipe 13 is arranged in the cartridge housing 11 along the axial direction of the cartridge housing 11. The upper end of the vent pipe 13 is connected to the sealing member 14 and is in communication with the smoke outlet hole 141. Specifically, the upper end of the vent pipe 13 is inserted into the smoke outlet hole 141. The lower end of the vent pipe 13 is connected with the atomizing head 12 and is in communication with the atomizing head 12. A liquid storage cavity 111 for storing e-liquid is formed inside the cartridge housing 11. The liquid storage cavity 111 is defined by the space between the vent pipe 13, the cartridge housing 11, the atomizing head 12 and the sealing member 14.

The atomizing head 12 includes a heating device 121 and a fixing bracket 122. The heating device 121 is installed on the fixed bracket 122. The heating device 121 is configured to absorb e-liquid from the liquid storage cavity 111 and heat the e-liquid to atomize the e-liquid, the formed smoke is discharged through the vent pipe 13 and the smoke outlet hole 141 for the user to inhale.

The heating device 121 includes a liquid absorbing member 123 and a heating member 124 used together with the liquid absorbing member 123. The liquid absorbing member 123 is in communication with both the liquid storage cavity 111 and the inner cavity of the fixing bracket 122. The liquid absorbing member 123 is configured to absorb the e-liquid contained in the liquid storage cavity 111, so as to absorb the e-liquid from the liquid storage cavity 111 into the atomizing head 12, wherein the liquid inlet passage is shown by the dotted arrow A in FIG. 7. The heating member 124 is located in the inner cavity of the fixing bracket 122. The heating member 124 can be wrapped around the liquid absorbing member 123. The heating member 124 is configured to heat and atomize the e-liquid absorbed by the liquid absorbing member 123. The liquid absorbing member 123 can be made of one or more of cotton, glass fiber, cotton cloth, foamed metal, porous ceramics, and foamed graphite. The heating member 124 can be a heating wire, a heating sheet, a heating film, a heating plate, a heating tube or a heating block, etc., which is not limited here.

In this embodiment, two opposite side walls of the lower part of the fixing bracket 122 are each provided with a mounting hole 125 with an opening facing downwards. Two ends of the liquid absorbing member 123 are embedded in the mounting holes 125 along the lateral direction of the fixing bracket 122. The heating member 124 is wrapped around the middle of the liquid absorbing member 123. The upper part of the fixing bracket 122 is provided with a cylindrical positioning portion 126. The positioning portion 126 is provided with a through hole 127 communicating with the inner cavity of the fixing bracket 122. The aperture size of the through hole 127 matches the outer diameter of the lower end of the vent pipe 13. The lower end of the vent pipe 13 is inserted into the through hole 127. In this way, the smoke generated by the heating device 121 can be discharged upwardly to the vent pipe 13 via the through hole 127, and the smoke will not leak from the gap between the through hole 127 and the vent pipe 13.

In this embodiment, the upper end of the cartridge housing 11 is provided with an opening 112. The lower end of the cartridge housing 11 is provided with a bottom base 113. The atomizing head 12 and the vent pipe 13 are disposed into the cartridge housing 11 from the opening 112 at the upper end of the cartridge housing 11, the atomizing head 12 is installed on the bottom base 113 of the cartridge housing 11 through the fixing bracket 122, and then the sealing member 14 seals the opening 112. Specifically, in this embodiment, referring to FIG. 4, the bottom base 113 is provided with two latching seats 116 extending toward the inside of the cartridge housing 11. Each latching seat 116 is provided with a latching slot 117 with an opening facing upwards. The fixing bracket 122 is installed on the latching seats 116 and is attached to the latching seats 116. The latching slot 117 matches with the mounting hole 125 of the fixing bracket 122. Specifically, the fixing bracket 122 is clamped between the two latching seats 116. The two opposite side walls of the fixing bracket 122 that are provided with the mounting holes 125 are abutted against the two latching seats 116, and the mounting hole 125 is aligned with a corresponding latching slot 117. The two ends of the liquid absorbing member 123 are also clamped in the latching slots 117 of the latching seats 116 and then extend into the liquid storage cavity 111. The other two opposite side walls of the fixing bracket 122 are abutted against the inner wall of the cartridge housing 11, so that the atomizing head 12 is installed at the lower end of the interior of the cartridge housing 11. In addition, it should be noted that under the support of the latching slots 117, a gap is left between the liquid absorbing member 123 and the bottom base 113.

It is understood that in other embodiments, the lower end of the cartridge housing 11 may also be opened. That is, the lower end of the cartridge housing 11 is not provided with the bottom base 113, and a bottom base is formed on the atomizing head 12. When the atomizing head 12 is installed on the lower end of the cartridge housing 11, the bottom base on the atomizing head 12 is inserted into the lower end of the cartridge housing 11 to seal the opening at the lower end of the cartridge housing 11, which is also possible.

Further, the atomizing head 12 also includes a pair of electrode contacts 128, the pins at two ends of the heating member 124 are electrically connected to the two electrode contacts 128, respectively, and the two electrode contacts 128 are electrically insulated from each other. Specifically, in this embodiment, one end of each electrode contact 128 is provided with a clamping slot 129. The pin at each end of the heating member 124 is clamped into a corresponding clamping slot 129 so as to electrically connect with a corresponding electrode contact 128. The two electrode contacts 128 are arranged on the other two opposite sides of the fixing bracket 122. The fixing bracket 122 is made of an insulating material. The two electrode contacts 128 are electrically insulated by the fixing bracket 122. In addition, referring to FIGS. 2, 7 and 8, the bottom base 113 of the cartridge housing 11 is provided with two through slots 114. The other end of each electrode contact 128 extends through a corresponding through slot 114 and is exposed, and then the exposed end of the electrode contact 128 is bent in order to fix the electrode contact 128 on the bottom base 113. Specifically, the electrode contact 128 includes a main body 1281 and a mounting portion 1283 provided at one side of the lower end of the main body 1281. The upper end and two opposite sides of the main body 1281 are each provided with a clamping portion 1285. The other two opposite sides of the fixing bracket 122 are provided with installation windows (not labeled), and the clamping portion 1285 extends into the installation window to resist the inner wall of the fixing bracket 122, so that the electrode contact 128 is installed on the fixing bracket 122. The clamping slot 129 is defined on the other side of the lower end of the main body 1281. The lower end of the main body 1281 is further provided with a relief groove 1287 located on the side of the clamping slot 129. The relief groove 1287 provides a relief space for the groove wall of the clamping slot 129, thereby facilitating the pin of the heating member 124 to be clamped in the clamping slot 129. The mounting portion 1283 extends through a corresponding through slot 114 of the bottom base 113 and is exposed, and then the mounting portion 1283 is bent in order to fix the electrode contact 128 on the bottom base 113.

In addition, the bottom base 113 of the cartridge housing 11 is provided with an air inlet hole 115, air can enter the atomizing head 12 from the outside of the cartridge housing 11 through the air inlet hole 115. When using the electronic cigarette, the air entering the electronic cigarette from the outside can enter the inner cavity of the fixed bracket 122 through the air inlet hole 115, and the heating device 121 heats the e-liquid to atomize it to produce smoke. After the air is mixed with smoke, it is discharged through the vent pipe 13 to be inhaled by the user. The airflow path is shown by the dotted arrow B in FIG. 7. The air inlet hole 115 is located between the two latching seats 116. Since under the support of the latching slot 117, there is a gap formed between the liquid absorbing member 123 and the bottom base 113, the liquid absorbing member 123 will not block the air inlet hole 115.

Herein, it should be noted that, since the two opposite side walls of the fixing bracket 122 installed with the electrode contacts 128 are abutted against the inner wall of the cartridge housing 11, the e-liquid in the liquid storage cavity 111 can only enter the atomizing head 12 by being absorbed by the liquid absorbing member 123. The e-liquid has a certain viscosity, when the liquid absorbing member 123 is full of e-liquid, the e-liquid in the liquid storage cavity 111 will no longer be absorbed into the atomizing head 12. Therefore, the e-liquid in the liquid storage cavity 111 will not flow out of the cartridge housing 11 through the vent pipe 13, the through slot 114 and the air inlet hole 115 of the bottom base 113 of the cartridge housing 11.

Further, the cartridge 10 further includes a top cover 15, the top cover 15 is arranged on the upper end of the cartridge housing 11 and covers the sealing member 14. The top cover 15 is provided with a smoke outlet opening 151. The smoke outlet opening 151 is in communication with the smoke outlet hole 141 of the sealing member 14. Therefore, the user can suck through the top cover 15. In this embodiment, there are two smoke outlet openings 151 provided on the top cover 15 and are arranged symmetrically along the left-to-right direction. Specifically, first protrusions 118 can be provided on both sides of the cartridge housing 11, first grooves 152 are provided at corresponding positions of the top cover 15. When the top cover 15 is covered on the upper end of the cartridge housing 11, the first groove 152 and the first protrusion 118 are engaged with each other, so that the top cover 15 is connected to the cartridge housing 11. The inner peripheral wall of the top cover 15 has a resisting portion (not labeled) protruding inwardly, when the resisting portion abuts against the sealing member 14, the top cover 15 is installed in place. The presence of the abutting portion causes a gap existing between the top wall of the top cover 15 and the upper end surface of the sealing member 14, so that the smoke outlet hole 141 can communicate with the smoke outlet opening 151 through the gap. The inner side of the top wall of the top cover 15 is provided with a guiding portion 153 protruding downward along the axial direction of the top cover 15. The guiding portion 153 is arranged opposite to the smoke outlet hole 141. The smoke outlet openings 151 are located on opposite sides of the guiding portion 153. When the top cover 15 is installed in place, the top wall of the top cover 15 and the sealing member 14 are spaced apart, and a gap is formed between the guiding portion 153 and the sealing member 14. The smoke flows out through the smoke outlet hole 141, the gap between the guiding portion 153 and the sealing member 14, the inner cavity of the top cover 15 and the smoke outlet openings 151 in sequence, to prevent the smoke from directly rushing through the smoke outlet openings 151 to cause the user to choke.

Further, the cartridge 10 also includes a protective cover 16, the protective cover 16 is arranged on the lower end of the cartridge housing 11 and covers the bottom base 113 of the cartridge housing 11 to achieve a protective function. In addition, second protrusions 119 can be provided on the cartridge housing 11, second grooves 161 are provided at corresponding positions of the protective cover 16. When the protective cover 16 is covered on the lower end of the cartridge housing 11, the second groove 161 and the second protrusion 119 have a guiding function, which facilitates the installation of the protective cover 16 on the cartridge housing 11.

Figure 3:
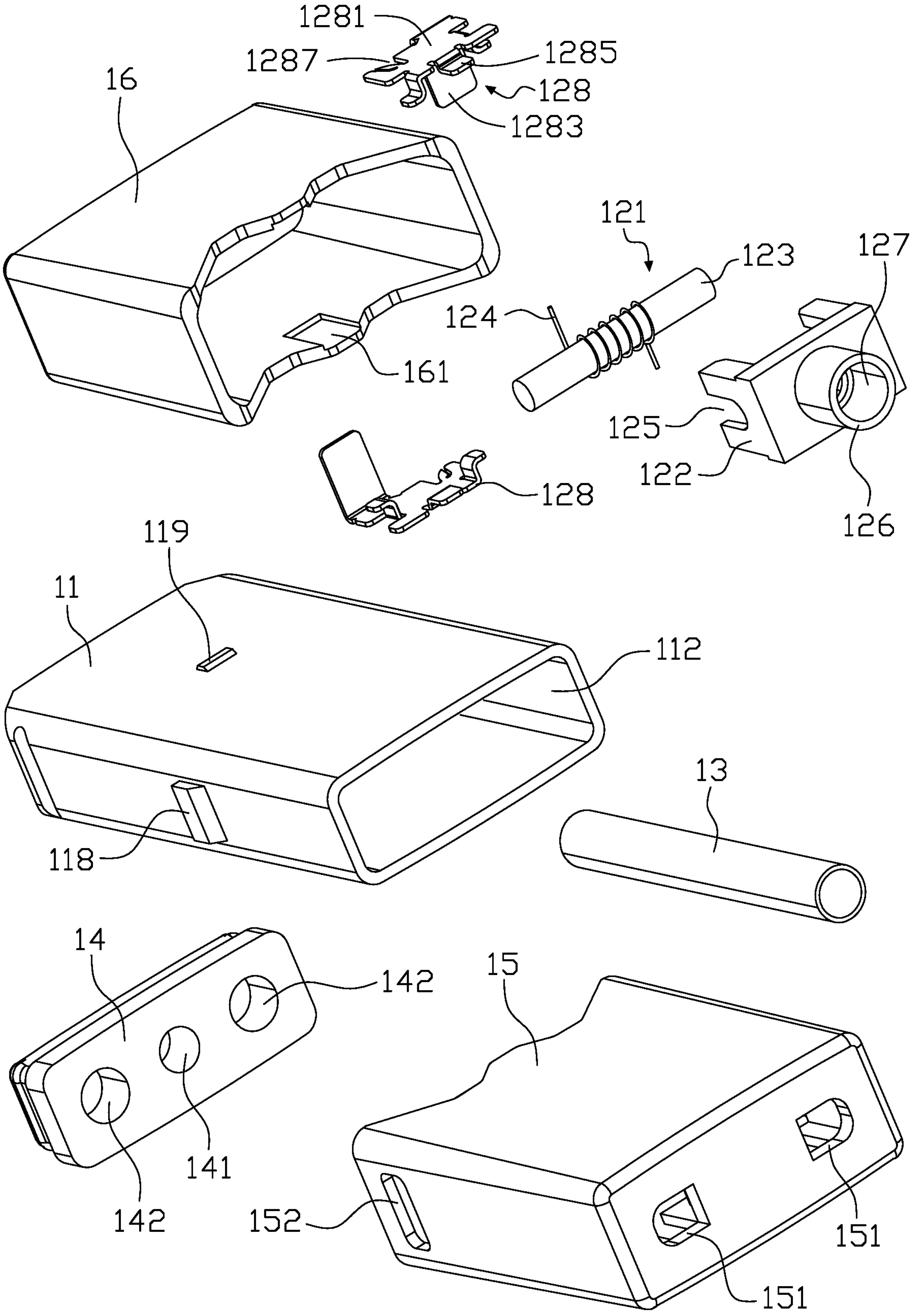
FIG. 3 is another exploded view of the cartridge shown in FIG. 1.
Figure 4:
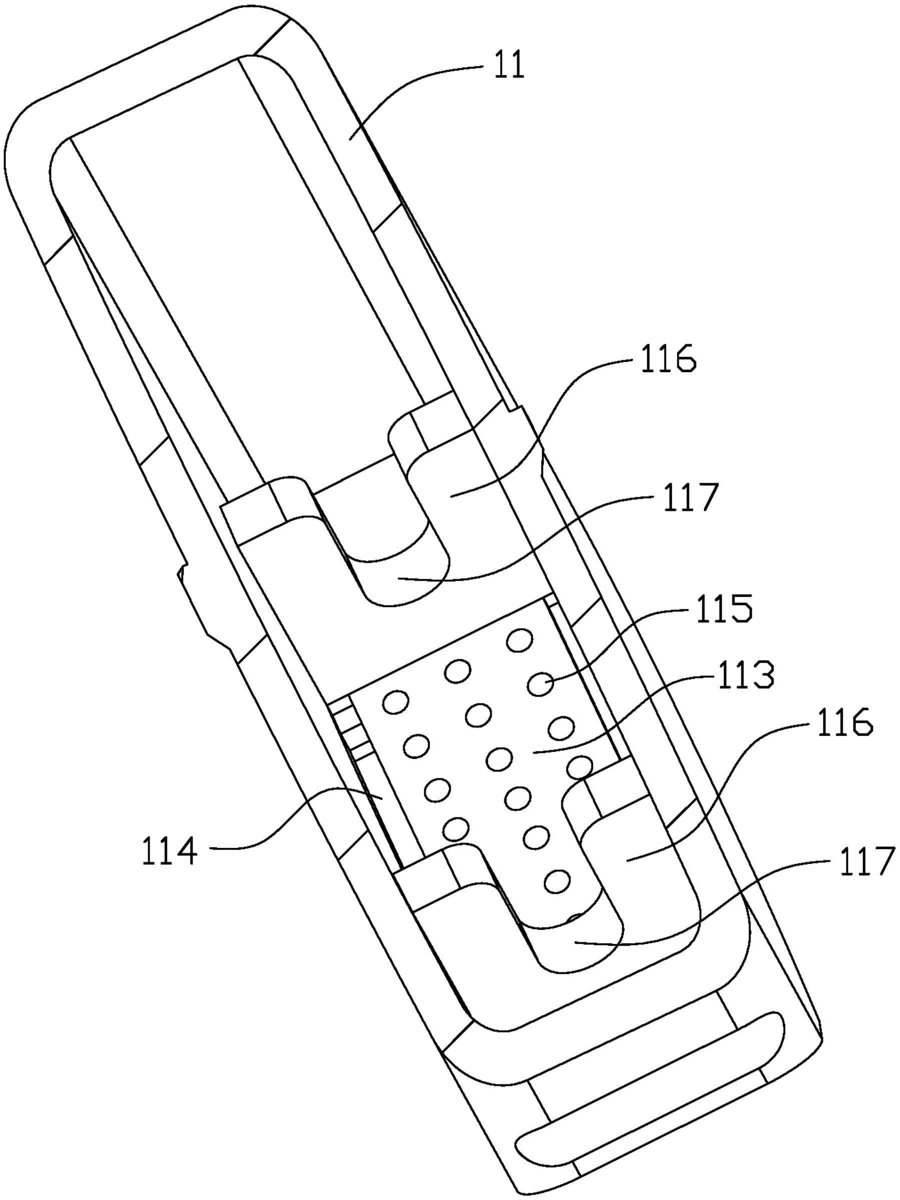
FIG. 4 is an isometric view of the cartridge housing of the cartridge shown in FIG. 1.
Figure 5:
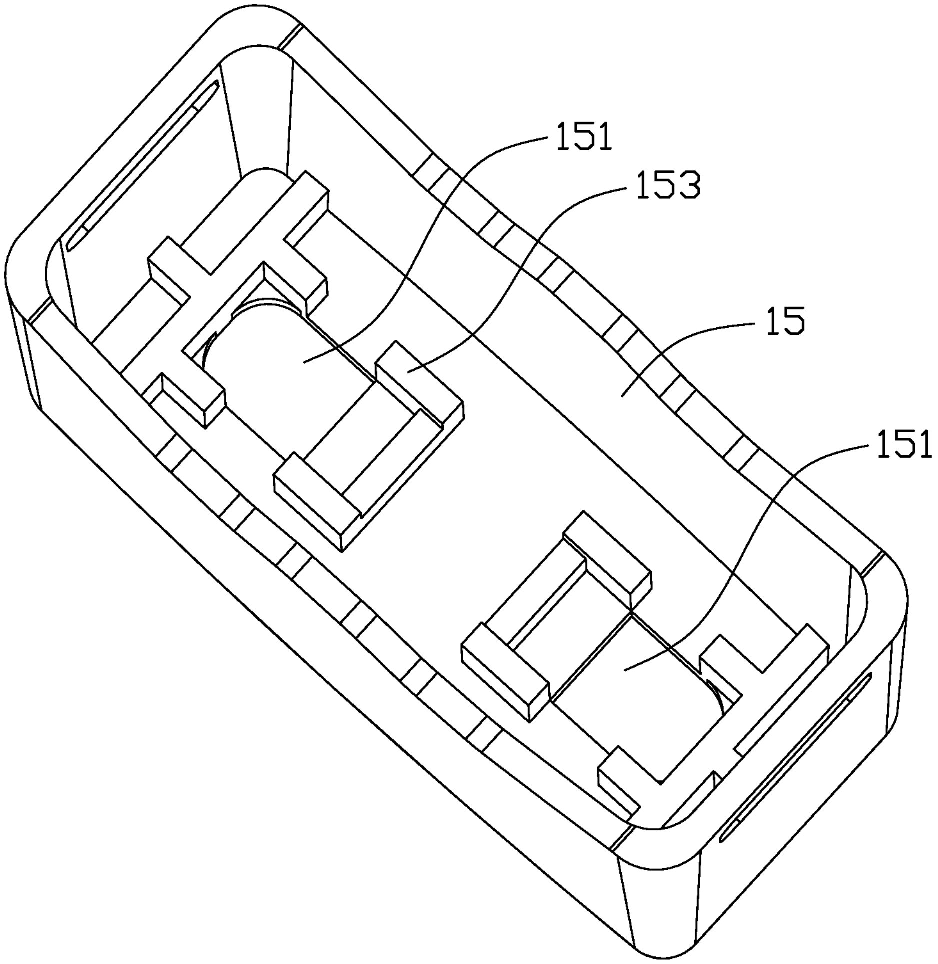
FIG. 5 is an isometric view of the top cover of the cartridge shown in FIG. 1.
Figure 6:
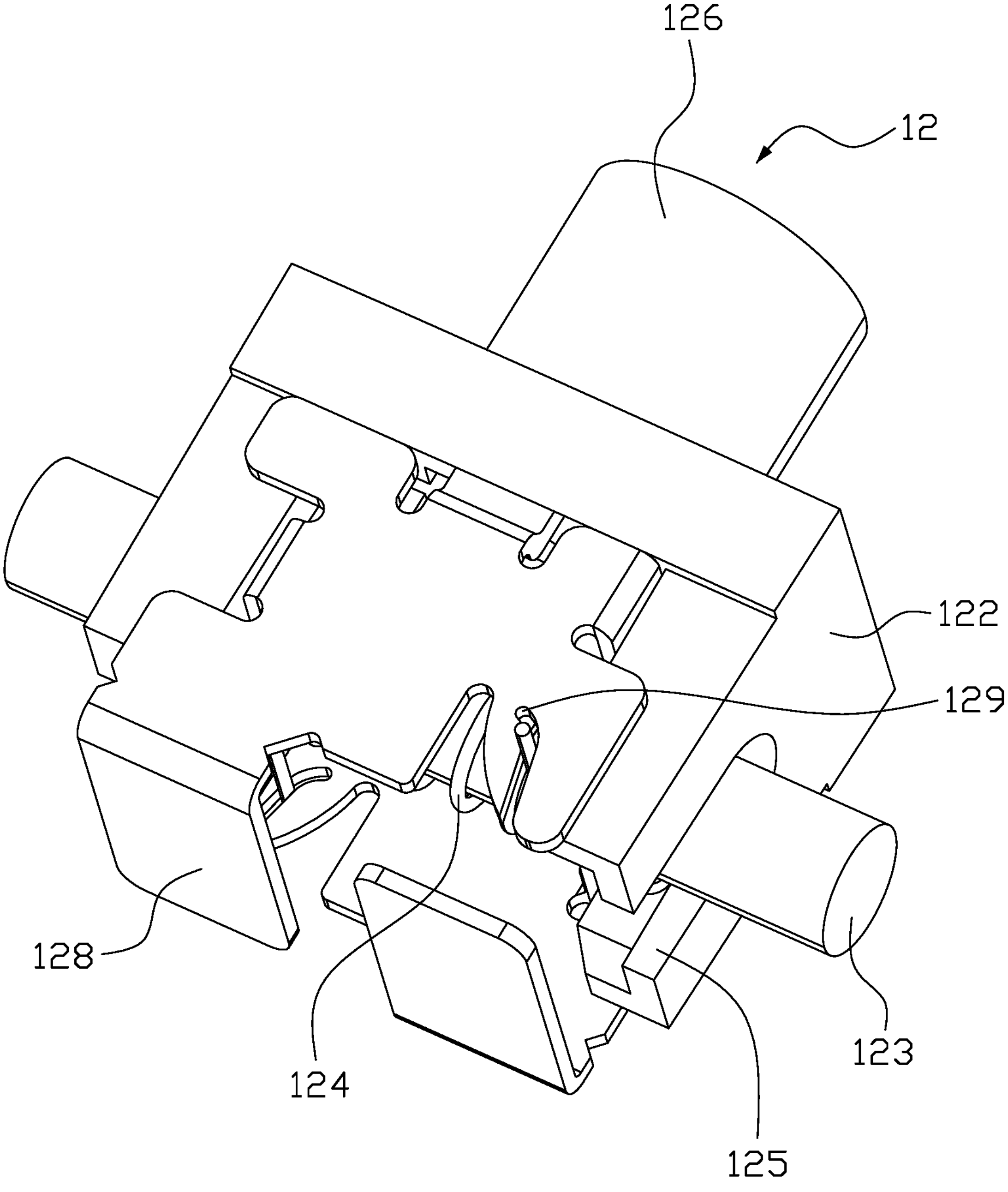
FIG. 6 is an isometric view of the atomizing head of the cartridge shown in FIG. 1.
Figure 7:
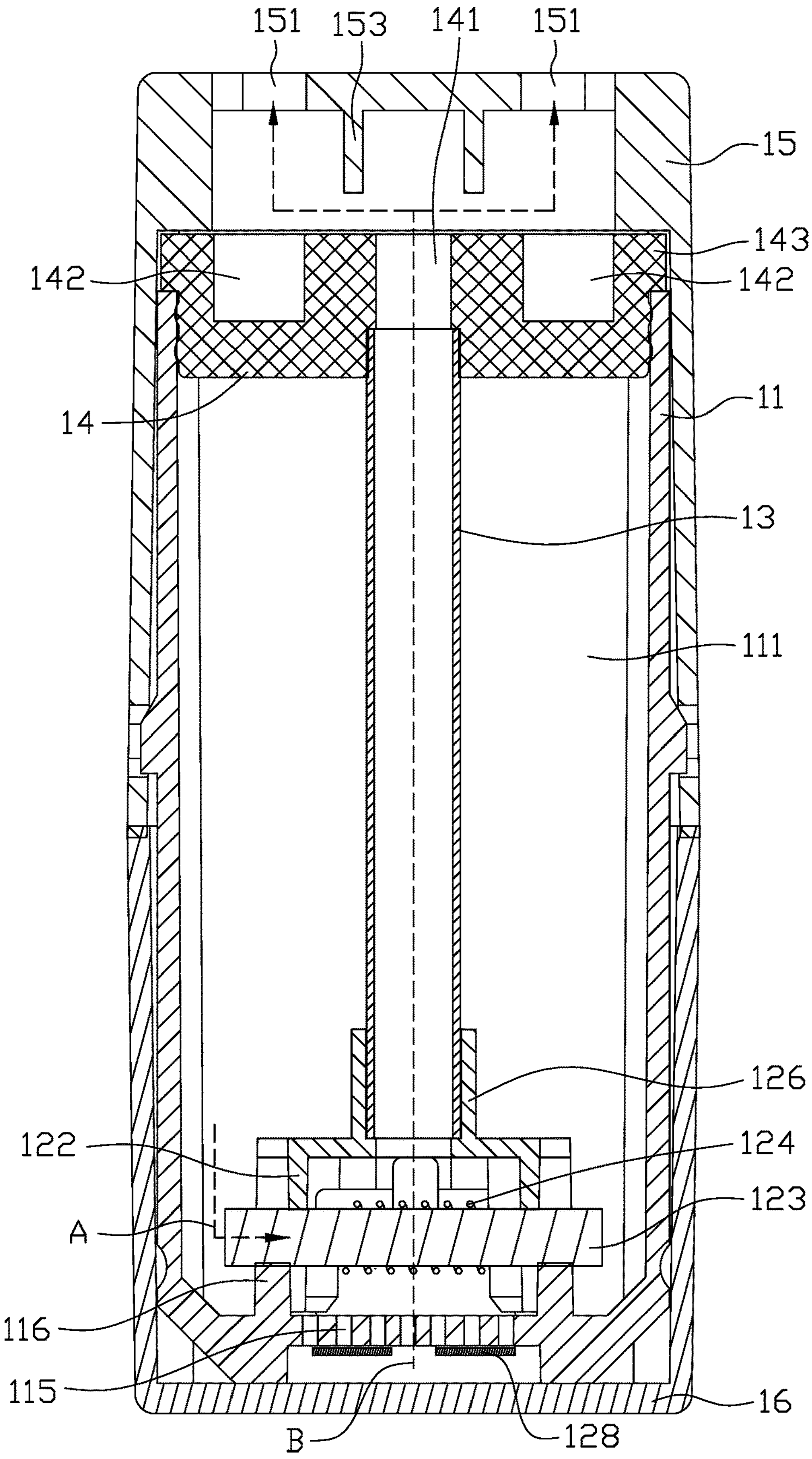
FIG. 7 is a cross-sectional view of the cartridge shown in FIG. 1 along the axial direction.
Figure 8:
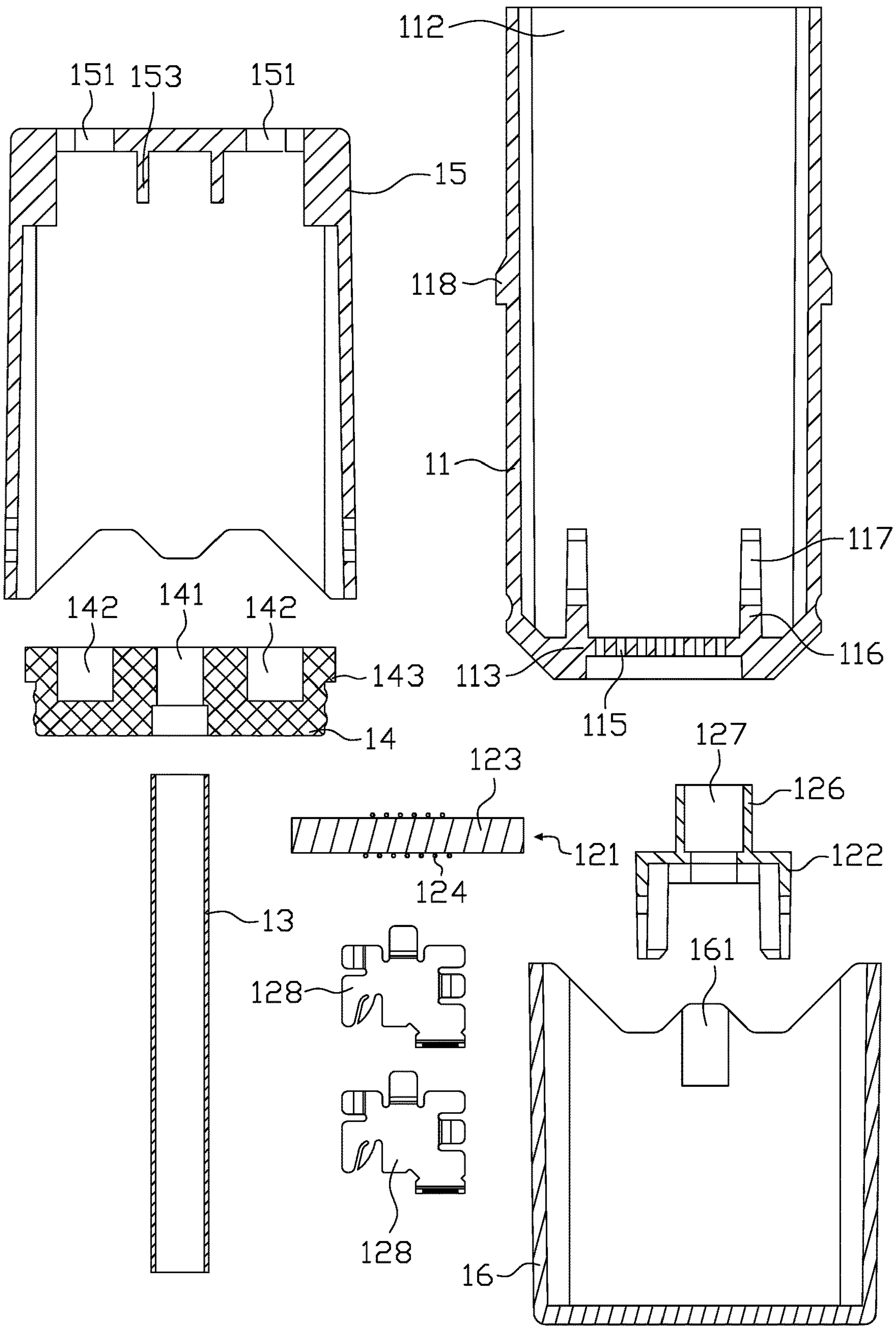
FIG. 8 is an exploded view of the cartridge shown in FIG. 1 in a sectional state.

Please refer to FIGS. 3, 7, and 8, in this embodiment, the sealing member 14 is provided on the upper end of the cartridge housing 11. The upper end of the vent pipe 13 is connected to and in communication with the smoke outlet hole 141 of the sealing member 14. Specifically, the sealing member 14 may be made of a soft material with elastic deformation ability, and can be a highly elastic polymer, such as rubber or silicone. The sealing member 14 may also be made of a self-healing material, in this way, the sealing member 14 can be pierced by a sharp object, and can be automatically restored and re-sealed again after the sharp object is pulled out. The sealing member 14 is configured to seal the liquid storage cavity 111 to prevent the e-liquid in the liquid storage cavity 111 from leaking during transportation, storage or use. The sealing member 14 is also configured, after the cartridge 10 is assembled, for a liquid injection needle 61 to pierce the sealing member 14 in order to inject e-liquid into the liquid storage cavity 111, and the sealing member 14 automatically restores after the liquid injection needle 61 is pulled out, and seals the liquid storage cavity 111 again.

Specifically, in this embodiment, the sealing member 14 is provided with a blind hole 142 on each of two sides of the smoke outlet hole 141, and the position of the blind hole 142 is corresponding to the position of the smoke outlet opening 151 provided on the top cover 15. The presence of the blind hole 142 can reduce the thickness of the sealing member 14 at the pierced position, so that the liquid injection needle 61 can pierce the sealing member 14 more easily. The remaining part of the sealing member 14 still maintains a relatively large thickness, so that the sealing connection between the sealing member 14 and the upper end of the cartridge housing 11 is more stable. The upper end of the sealing member 14 further protrudes outward to form a limiting portion 143, when the sealing member 14 is installed on the upper end of the cartridge housing 11, the lower end of the sealing member 14 is squeezed into the cartridge housing 11, and the limiting portion 143 abuts against the upper end surface of the cartridge housing 11, so that the sealing member 14 is installed on the upper end of the cartridge housing 11 to prevent the sealing member 14 from being excessively inserted into the cartridge housing 11. When the liquid injection needle 61 pierces the sealing member 14 from the position of the smoke outlet opening 151 of the top cover 15 and the blind hole 142 of the sealing member 14 and extends into the cartridge housing 11, the liquid injection needle 61 can be used to inject e-liquid into the liquid storage cavity 111. Specifically, the liquid injection needle 61 is provided with a liquid injection passage 611. The distal end of the liquid injection needle 61 is provided with a liquid injection hole 612, the e-liquid is injected from the liquid injection passage 611 provided in the liquid injection needle 61, and flows out from the liquid injection hole 612 at the distal end of the liquid injection needle 61 to enter into the liquid storage cavity 111. After the liquid injection is completed, the liquid injection needle 61 is pulled out. Since the sealing member 14 is made of a highly elastic polymer or self-healing material, after the liquid injection needle 61 is pulled out, the sealing member 14 will form a self-sealing effect at the pierced position without leaving a hole, thereby avoiding liquid leakage.

In other embodiments, the top cover 15 can also be removed for liquid injection, so that the liquid injection needle 61 pierces from the position of the blind hole 142 of the sealing member 14 and extends into the cartridge housing 11 for liquid injection. After the liquid injection is completed, the top cover 15 is placed on the upper end of the cartridge housing 11 to cover the sealing member 14.

Second Embodiment

In the second embodiment of the present disclosure, an electronic cigarette is provided, which includes the cartridge 10 as described in the first embodiment and a battery assembly electrically connected to the cartridge 10 (not shown). The battery assembly includes a battery casing and a battery received in the battery casing. The cartridge 10 is detachably connected to the battery casing and electrically connected to the battery. For example, the cartridge 10 can be at least partially received in the battery casing and electrically connected to the battery.

When assembling the cartridge 10 with the battery assembly, the protective cover 16 is removed firstly, and then, the end of the cartridge housing 11 with the protective cover 16 being removed is inserted into the battery casing. When the cartridge 10 is connected to the battery assembly, the battery assembly and the heating member 124 are electrically connected through the exposed electrode contacts 128, and the battery assembly can provide power output for the heating member 124.

Further, the battery assembly further includes an air pressure sensor (not shown), the air pressure sensor detects the pressure change caused by the user's suction, and then transmits the signal to the control board (not shown) that is connected to the air pressure sensor. The control board judges whether the user is sucking or the strength of the sucking according to the signal, and outputs electric energy to the cartridge 10 or adjusts the electric energy output to the cartridge 10, so that the heating device 121 atomizes the e-liquid to produce smoke or adjust the amount of smoke. Understandably, in other embodiments, an airflow sensor may be provided instead of the air pressure sensor. The airflow sensor detects the change of the airflow generated during suction, and then feeds it back to the control board, the control board judges whether the user is sucking or the strength of the sucking according to the signal.

Third Embodiment

Figure 9:
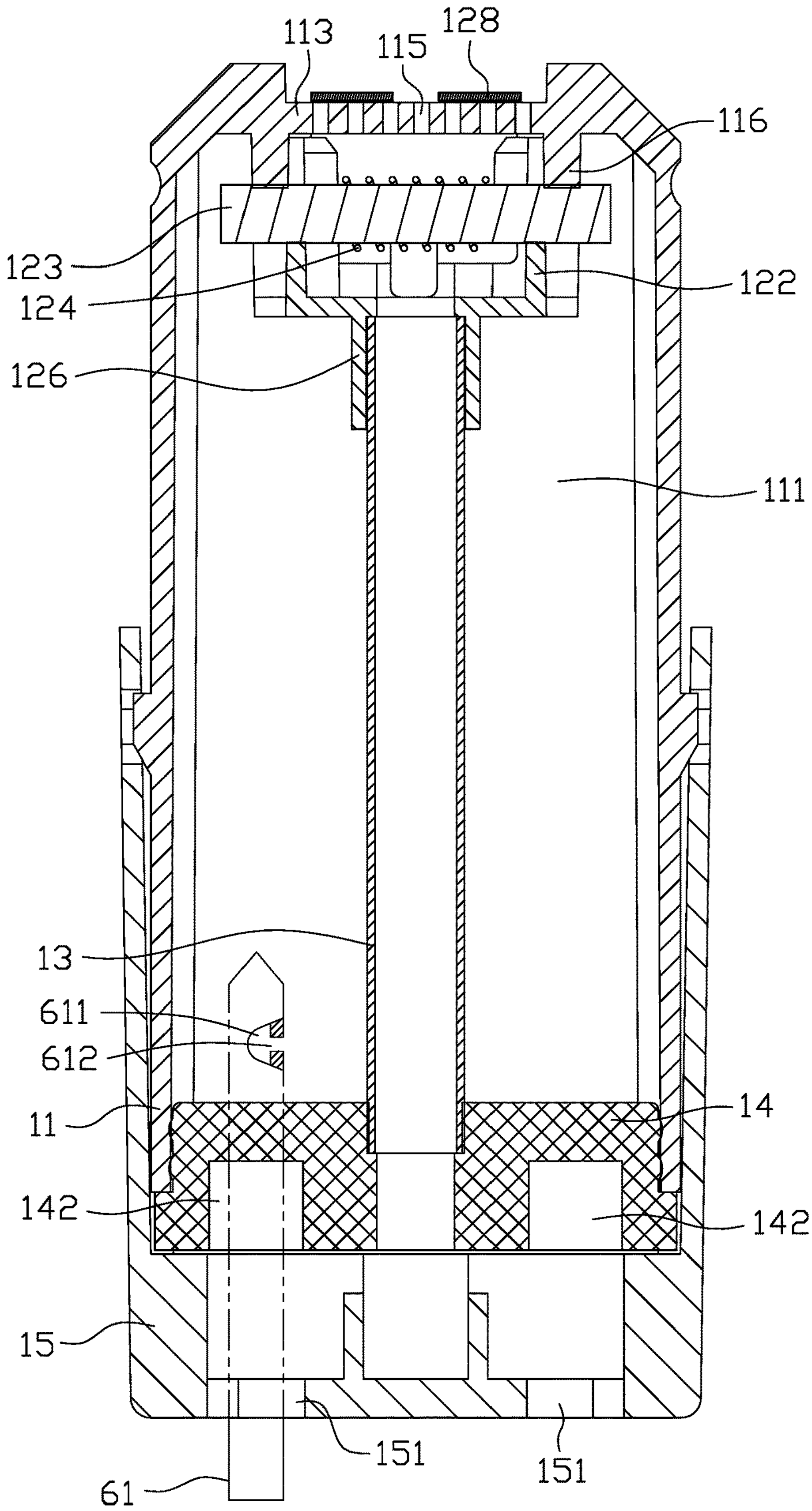
FIG. 9 is a schematic diagram of the cartridge shown in FIG. 1 being filled with liquid after being assembled.

With reference to FIG. 9, in the third embodiment of the present disclosure, a liquid injection method is further provided for injecting liquid into the cartridge 10 of the electronic cigarette. The cartridge 10 includes a cartridge housing 11, an atomizing head 12 and a sealing member 14. A liquid storage cavity 111 for storing e-liquid is formed inside the cartridge housing 11. The atomizing head 12 is arranged at the lower end of the cartridge housing 11. The sealing member 14 is arranged at the upper end of the cartridge housing 11 opposite to the atomizing head 12. The atomizing head 12 is in communication with the liquid storage cavity 111 and the outside. The liquid injection method includes:

the cartridge 10 is inverted;

the liquid injection needle 61 pierces the sealing member 14 of the cartridge 10 and extends into the cartridge housing 11 to inject e-liquid into the liquid storage cavity 111 of the cartridge 10; and after the liquid injection is completed, the liquid injection needle 61 is pulled out, and the sealing member 14 forms a self-sealing at the pierced position.

Specifically, the sealing member 14 may be made of a highly elastic polymer, such as rubber or silicone. Or, it can be made of a self-healing material, after the liquid injection needle 61 is pulled out, the sealing member 14 will form a self-sealing effect at the pierced position, leaving no holes and therefore no liquid leakage.

Fourth Embodiment

With reference to FIGS. 10-26, in the fourth embodiment of the present disclosure, a liquid injection device is further provided for injecting liquid into the cartridge 10 of the electronic cigarette. The cartridge 10 includes a cartridge housing 11, an atomizing head 12 and a sealing member 14. A liquid storage cavity 111 for storing e-liquid is formed inside the cartridge housing 11. The atomizing head 12 is arranged at the lower end of the cartridge housing 11. The sealing member 14 is arranged at the upper end of the cartridge housing 11 opposite to the atomizing head 12. The atomizing head 12 is in communication with the liquid storage cavity 111 and the outside. The liquid injection device includes:

- a vibrating and feeding mechanism 20 configured for sorting the cartridges 10 into an inverted state by means of vibration and then conveying and feeding the cartridges 10;
- a liquid injection mechanism 60 configured for driving the liquid injection needle 61 to pierce the sealing member 14 of the cartridge 10 and extend into the cartridge housing 11 to inject e-liquid into the liquid storage cavity 111 of the cartridge 10. After the liquid injection is completed, the liquid injection mechanism 60 is further configured for driving the liquid injection needle 61 to be pulled out of the cartridge 10. After the liquid injection needle 61 is pulled out, the sealing member 14 forms a self-sealing at the pierced position.

Further, in this embodiment, the liquid injection device further includes:

- a separating mechanism 30 configured for receiving the cartridges 10 being conveyed and fed, and separating a plurality of cartridges 10 that are located at the front end and abut against with each other, so that the plurality of cartridges 10 are separated from each other;
- a gripping and transferring mechanism 40 configured for gripping and transferring the plurality of cartridges 10 having been separated from each other to be loaded on a conveying fixture 51 of a conveying mechanism 50;
- the conveying mechanism 50 is configured for conveying the conveying fixture 51 loaded with the plurality of cartridges 10 to a position where the liquid injection mechanism 60 is located, the plurality of cartridges 10 are respectively corresponding to a plurality of liquid injection needles 61 provided on the liquid injection mechanism 60, so that the plurality of liquid injection needles 61 are used to respectively inject liquid into the plurality of cartridges 10; and
- a collecting mechanism 70 configured for taking out the plurality of cartridges 10 having been filled with liquid from the conveying fixture 51 of the conveying mechanism 50 to realize the collecting of the plurality of cartridges 10.

In this embodiment, the number of each of the vibrating and feeding mechanism 20, the separating mechanism 30 and the gripping and transferring mechanism 40 is two. That is, two sets of the vibrating and feeding mechanism 20, the separating mechanism 30 and the gripping and transferring mechanism 40 are used. Each set of the vibrating and feeding mechanism 20, the separating mechanism 30 and the gripping and transferring mechanism 40 can convey and load three cartridges 10 on the conveying fixture 51 of the transport mechanism 50 at each time. The conveying fixture 51 of the conveying mechanism 50 can be loaded with six cartridges 10 in total, that is, six cartridges 10 can be injected simultaneously each time, but it is not limited. In other embodiments, the number of the cartridges 10 that are conveyed and loaded on the conveying fixture 51 of the transport mechanism 50 by each set of the vibrating and feeding mechanism 20, the separating mechanism 30 and the gripping and transferring mechanism 40 is not limited to three, the total number of the cartridges 10 that are loaded on the conveying fixture 51 of the conveying mechanism 50 is not limited to six, and it is not limited to perform liquid injection for six cartridges 10 simultaneously each time. Or, in another embodiment, the respective number of the vibrating and feeding mechanism 20, the separating mechanism 30 and the gripping and transferring mechanism 40 is not limited to two. For example, the number of each of the vibrating and feeding mechanism 20, the separating mechanism 30 and the gripping and transferring mechanism 40 can be one. That is, there is only one set of the vibrating and feeding mechanism 20, the separating mechanism 30 and the gripping and transferring mechanism 40. The number of the cartridges 10 that can be simultaneously injected each time may also be designed according to actual needs.

Figure 10:
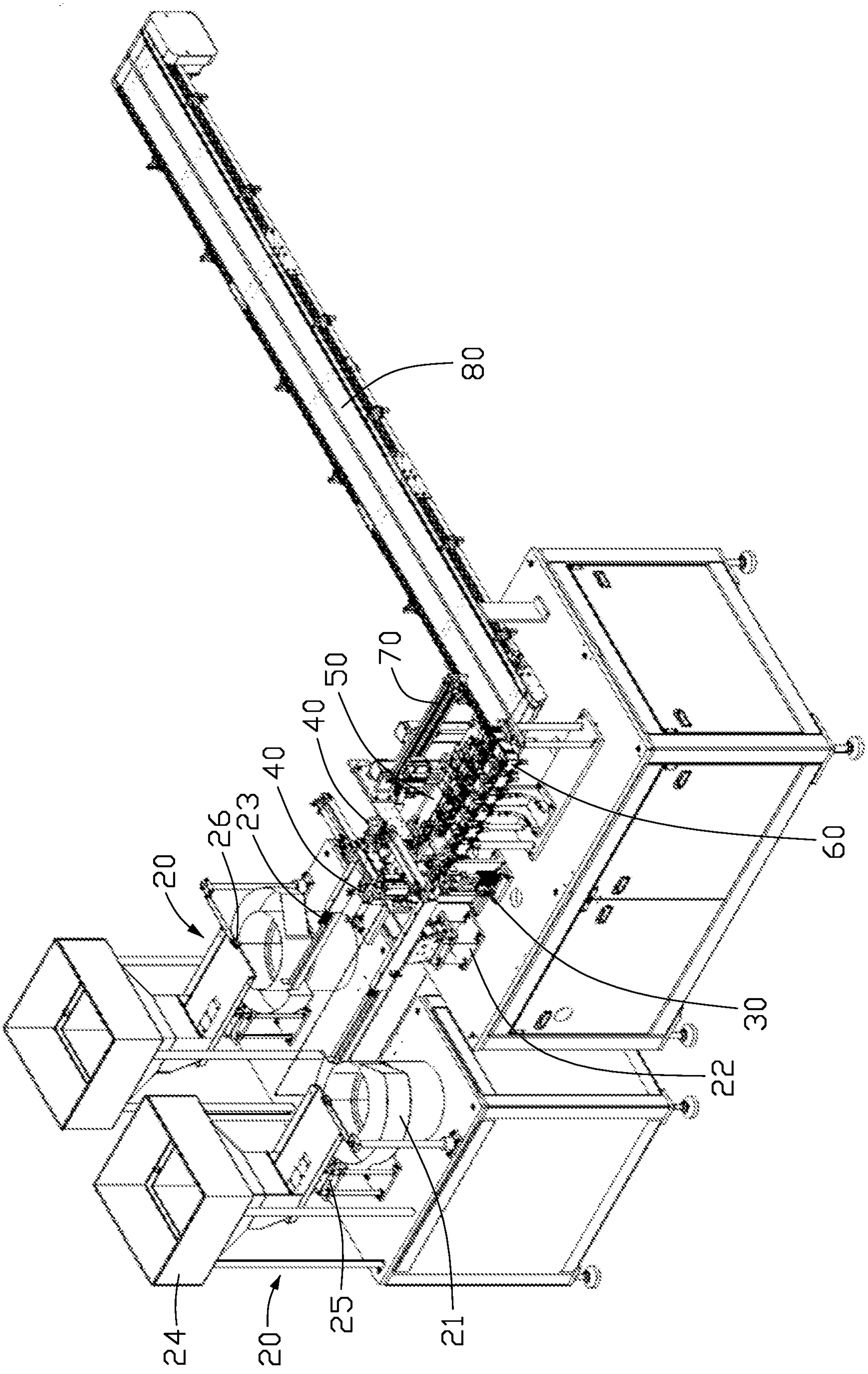
FIG. 10 is a general layout diagram of a liquid injection device in an embodiment of the present disclosure.
Figure 11:
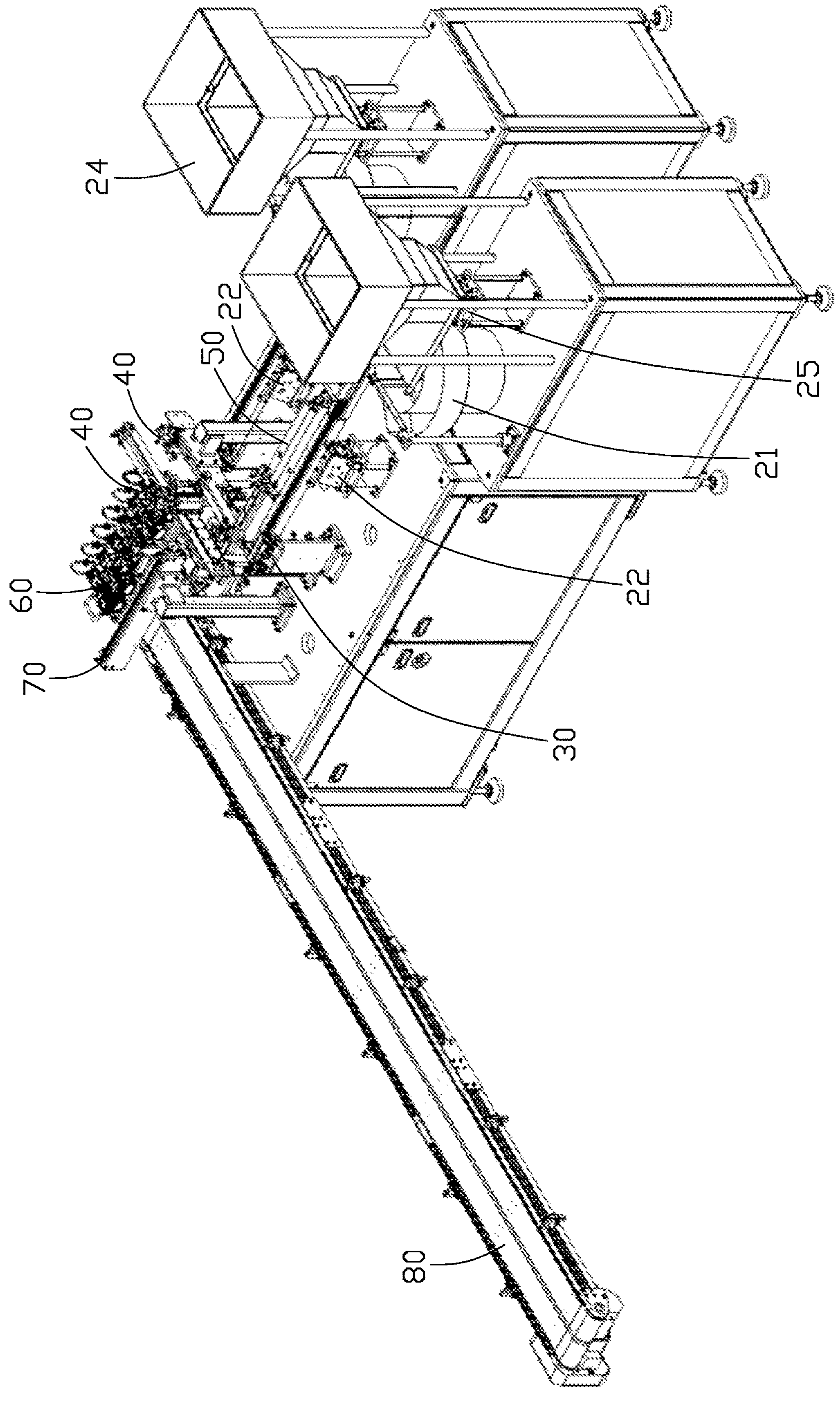
FIG. 11 is another general layout diagram of the liquid injection device shown in FIG. 10.
Figure 12:
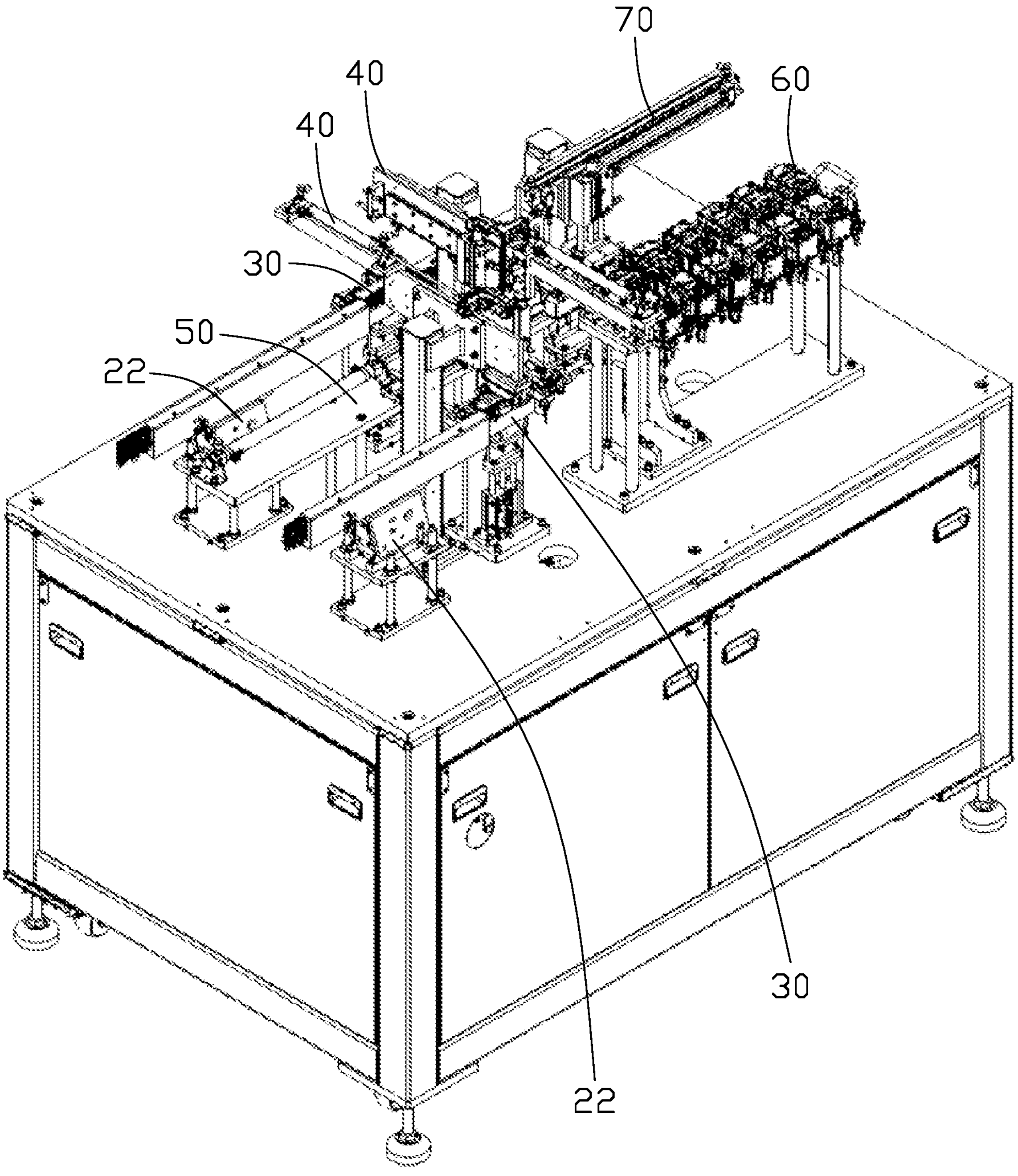
FIG. 12 is a layout diagram of the liquid injection device shown in FIG. 10 after removing the vibrating and feeding mechanism and the conveyor belt.

Specifically, referring to FIGS. 10 to 12, the vibrating and feeding mechanism 20 includes a circular vibration 21, a first straight vibration 22 and a first sensor 23. The front end of the circular vibration 21 is connected to the first straight vibration 22. The first sensor 23 is arranged above the first straight vibration 22. The first sensor 23 is configured to detect whether there is a shortage of material in the first straight vibration 22. When the first straight vibration 22 is short of material, the circular vibration 21 starts to feed. When the cartridge 10 in the first straight vibration 22 is sufficient, the circular vibration 21 stops working. When the cartridges 10 are fed by the circular vibration 21, the circular vibration 21 will sort the cartridges 10 into a unified inverted state. In this embodiment, since the mass of the end of the cartridge 10 with the sealing member 14 is greater than the mass of the other end with the atomizing head 12, the circular vibrator 21 can sort the cartridges 10 into a unified inverted state by means of vibration, so that the sealing member 14 is on the bottom and the atomizing head 12 is on the top, as shown in FIG. 9.

It should be noted that the cartridge 10 has not been installed with the protective cover 16 at this time. After the liquid injection is completed, the protective cover 16 is then installed manually or by a machine.

Further, in this embodiment, the vibrating and feeding mechanism 20 further includes a material storage bin 24, a second straight vibration 25, and a second sensor 26. The cartridges 10 can be poured into the material storage bin 24. The material storage bin 24 can store about 4000 materials. The number of materials stored in the material storage bin 24 is more than the number of materials stored in the circular vibration 21, thereby reducing the frequency of adding materials to the vibrating and feeding mechanism 20 and improving the level of automation. In other embodiments, the materials stored in the material storage bin 24 are not limited to 4000. The second straight vibration 25 is located under the material storage bin 24, and the second straight vibration 25 is configured to feed the cartridges 10 in the material storage bin 24 to the circular vibration 21 by means of vibration. The material storage bin 24 is provided with a baffle (not shown) on the side facing the main machine, and the baffle can prevent too many cartridges 10 in the material storage bin 24 from entering the second straight vibration 25. The second sensor 26 is located above the circular vibration 21. The second sensor 26 is configured to detect whether there is a shortage of material in the circular vibration 21. When the second sensor 26 detects that there is no material in the circular vibration 21, the material storage bin 24 feeds the cartridges 10 to the circular vibration 21 through the second straight vibration 25 located below the material storage bin 24. When the cartridge 10 is sufficient in the circular vibration 21, the second straight vibration 25 stops working. Then, the circular vibration 21 will sort the cartridges 10 into a unified inverted state and send them to the first constant vibration 22. The first straight vibration 22 then conveys by vibration the cartridges 10 that have been sorted into a unified inverted state to the separating mechanism 30.

In this embodiment, both the first sensor 23 and the second sensor 26 are optical sensors.

Figure 13:
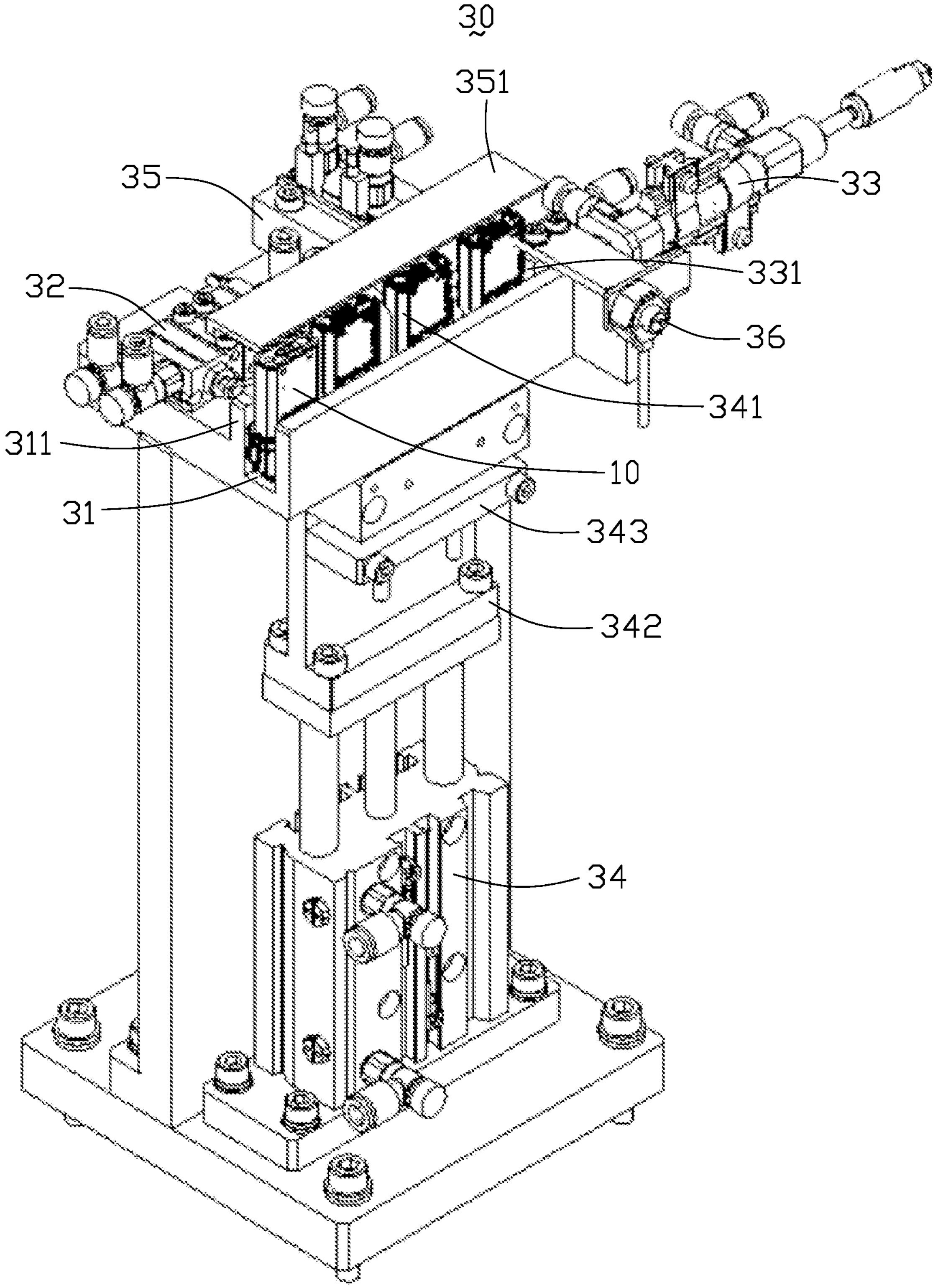
FIG. 13 is a layout diagram of the separating mechanism of the liquid injection device shown in FIG. 10.
Figure 14:
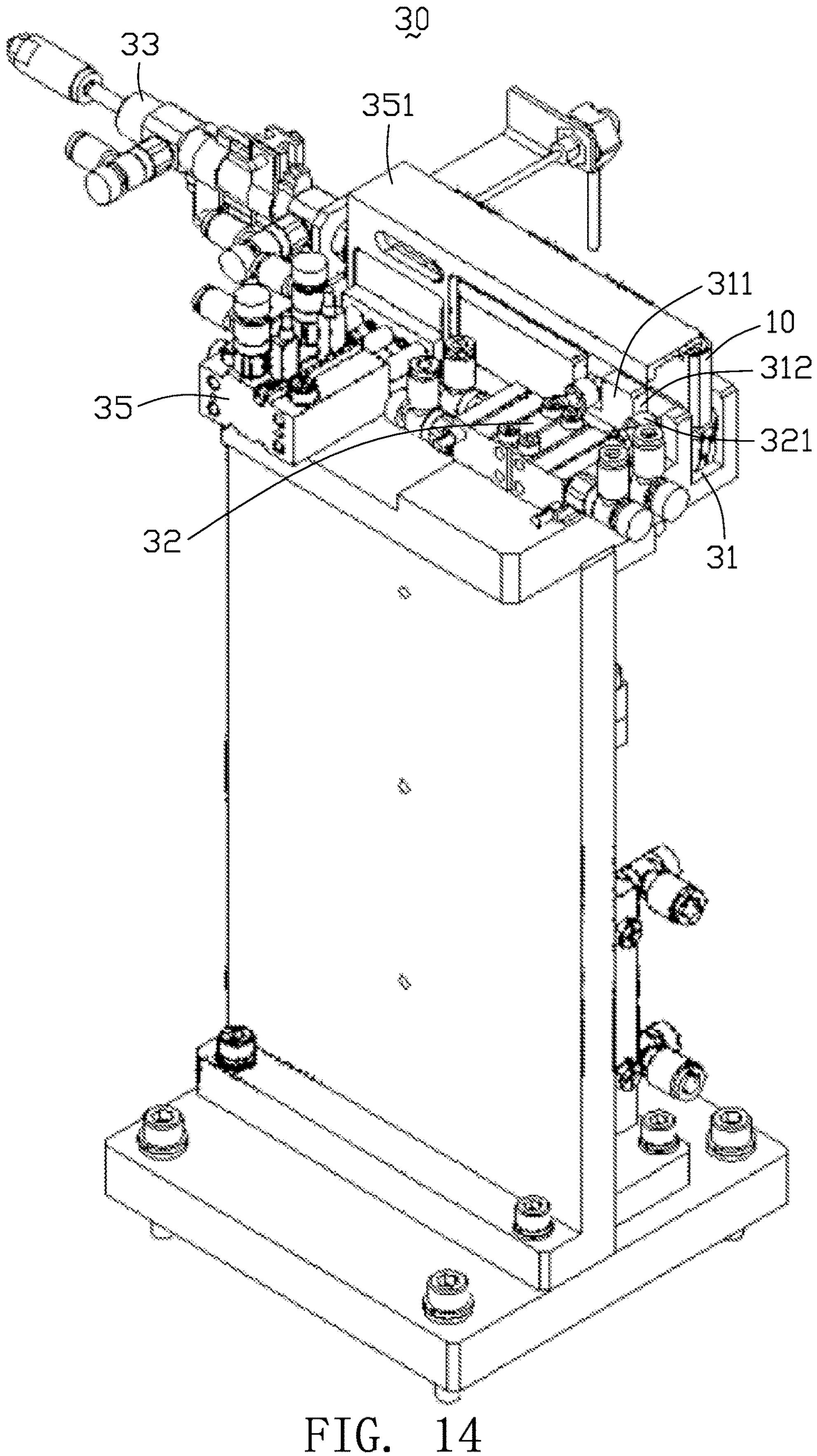
FIG. 14 is another layout diagram of the separating mechanism of the liquid injection device shown in FIG. 10.

Specifically, referring to FIGS. 13-14, the separating mechanism 30 includes a limiting groove 31, a limiting cylinder 32, an abutting cylinder 33, and a separating cylinder 34. The entrance end of the limiting groove 31 is connected with the front end of the vibrating and feeding mechanism 20. Specifically, the entrance end of the limiting groove 31 is connected with the front end of the first straight vibration 22 of the vibrating and feeding mechanism 20. A side wall 311 of the limiting groove 31 is provided with a notch 312 near the entrance end of the limiting groove 31. The limiting cylinder 32 is perpendicular to the side wall 311 of the limiting groove 31 and is arranged horizontally. The limiting cylinder 32 is connected with an abutting head 321, and the abutting head 321 is corresponding to the notch 312. The abutting cylinder 33 is arranged on the extension line of the limiting groove 31 and is arranged horizontally. An abutting block 331 is connected to the abutting cylinder 33, and the abutting block 331 is corresponding to the front end of the limiting groove 31. The front end of the limiting groove 31 is arranged opposite to the entrance end of the limiting groove 31. That is, the front end and the entrance end are the two ends of the limiting groove 31 respectively. The separating cylinder 34 is located under the limiting groove 31, the separating cylinder 34 is perpendicular to the bottom wall of the limiting groove 31 and is arranged vertically. The separating cylinder 34 is connected with a plurality of separating rods 341. The number of the separating rods 341 is less than the number of the cartridges 10 entering the limiting groove 31 by one. In this embodiment, the number of the cartridges 10 entering the limiting groove 31 is four, and the number of the separating rod 341 is three.

When the cartridges 10 are fed to the limiting groove 31, the limiting cylinder 32 drives the abutting head 321 to retract, and at the same time, the abutting cylinder 33 drives the abutting block 331 to extend into the limiting groove 31 from the front end of the limiting groove 31; the cartridges 10 fed from the vibrating and feeding mechanism 20 are regularly arranged to enter into the limiting groove 31, the abutting block 331 abuts against a cartridge 10 that is positioned at the foremost position in the limiting groove 31. The abutting block 331 is configured to control the number of the cartridges 10 fed into the limiting groove 31. In this embodiment, under the limitation of the abutting block 331, only four cartridges 10 can be fed to and accommodated in the limiting groove 31.

A third sensor 36 is provided on the separating mechanism 30. The third sensor 36 is arranged outside the front end of the limiting groove 31, the third sensor 36 is directly facing the virtual position at the front end of the limiting groove 31. When the abutting cylinder 33 drives the abutting block 331 to extend into the limiting groove 31 from the front end of the limiting groove 31 in order to control the number of the cartridges 10 fed into the limiting groove 31, the virtual position is located at the position of the cartridge 10 which abuts against the abutting block 331. When the third sensor 36 detects that there is a cartridge 10 at the virtual position, it is determined that there are four cartridges 10 fed in the limiting groove 31, and at this time, the limiting cylinder 32 drives the abutting head 321 to extend out, the abutting head 321 passes through the notch 312 and presses against the cartridge 10 that is located closest to the entrance end in the limiting groove 31 (that is, the cartridge 10 in the limiting groove 31 located adjacent to the vibrating and feeding mechanism 20); meanwhile, the abutting cylinder 33 drives the abutting block 331 to retract, and the retracted distance is just enough for the four cartridges 10 to be arranged separately in the limiting groove 31. That is, the retracted distance is just enough for the insertion of the three separating rods 341.

Then, the separating cylinder 34 drives the plurality of separating rods 341 to move up vertically, the bottom wall of the limiting groove 31 is provided with through holes (not shown), so that the plurality of separating rods 341 can be respectively squeezed and inserted between the adjacent cartridges 10 from bottom to top through the through holes, and the four cartridges 10 originally abutting against each other in the limiting groove 31 are separated from each other. Since the cartridge 10 located closest to the entrance end of the limiting groove 31 is pressed by the abutting head 321 and cannot move, therefore, the remaining three cartridges 10 in the limiting groove 31 can move toward the front end of the limiting groove 31 (that is, toward the abutting cylinder 33), so that the four cartridges 10 in the limiting groove 31 are separated from each other, and the distance between two adjacent cartridges 10 is exactly the width of a separating rod 341. That is, the four cartridges 10 in the limiting groove 31 are equally spaced apart. Understandably, in other embodiments, the abutting block 331 may be gradually retracted, and the separating rods 341 are gradually inserted. In this way, the cartridges 10 can be prevented from falling down under the effect of the separating rods 341.

Further, in this embodiment, the separating mechanism 30 further includes a pressing cylinder 35, and the pressing cylinder 35 is connected with a pressing plate 351. The opening of the limiting groove 31 faces upwards. Before the cartridges 10 enter the limiting groove 31, the pressing cylinder 35 drives the pressing plate 351 to move to just above the limiting groove 31. Specifically, the pressing cylinder 35 drives the pressing plate 351 to move from the outside of the side wall 311 to just above the limiting groove 31, so that when the cartridges 10 enter the limiting groove 31 and the cartridges 10 are separated by the plurality of separating rods 341, the pressing plate 351 is always located directly above the cartridges 10. Due to the existence of the pressing plate 351, the cartridges 10 can be confined in the limiting groove 31 by the pressing plate 351, and will not fall off or fall down. After the cartridges 10 are separated from each other in the limiting groove 31 by the plurality of separating rods 341, the pressing cylinder 35 drives the pressing plate 351 to move away from directly above the limiting groove 31, so as to facilitate the gripping and transferring mechanism 40 to take out the cartridges 10 from the limiting groove 31. It should be noted that, when the gripping and transferring mechanism 40 takes out the cartridges 10 from the limiting groove 31, the abutting head 321 always abuts against the cartridge 10 located closest to the entrance end of the limiting groove 31 (i.e., the cartridge 10 in the limiting groove 31 that is located adjacent to the vibrating and feeding mechanism 20). The gripping and transferring mechanism 40 grips the remaining three cartridges 10 from the limiting groove 31.

In this embodiment, the separating cylinder 34 further includes a connecting block 342 and an adjusting plate 343. There are three separating rods 341 fixed on the adjusting plate 343. The adjusting plate 343 is connected to the connecting block 342 and can adjust the relative position of the connecting block 342 along the vertical direction. The adjusting plate 343 is configured to adjust the depth of the separating rods 341 inserted into the limiting groove 31. The separating cylinder 34 can drive the connecting block 342 to move up or down, the adjusting plate 343 moves up or down under the driving of the connecting block 342, and the separating rods 341 are driven by the adjusting plate 343 to move up or down.

Figure 15:
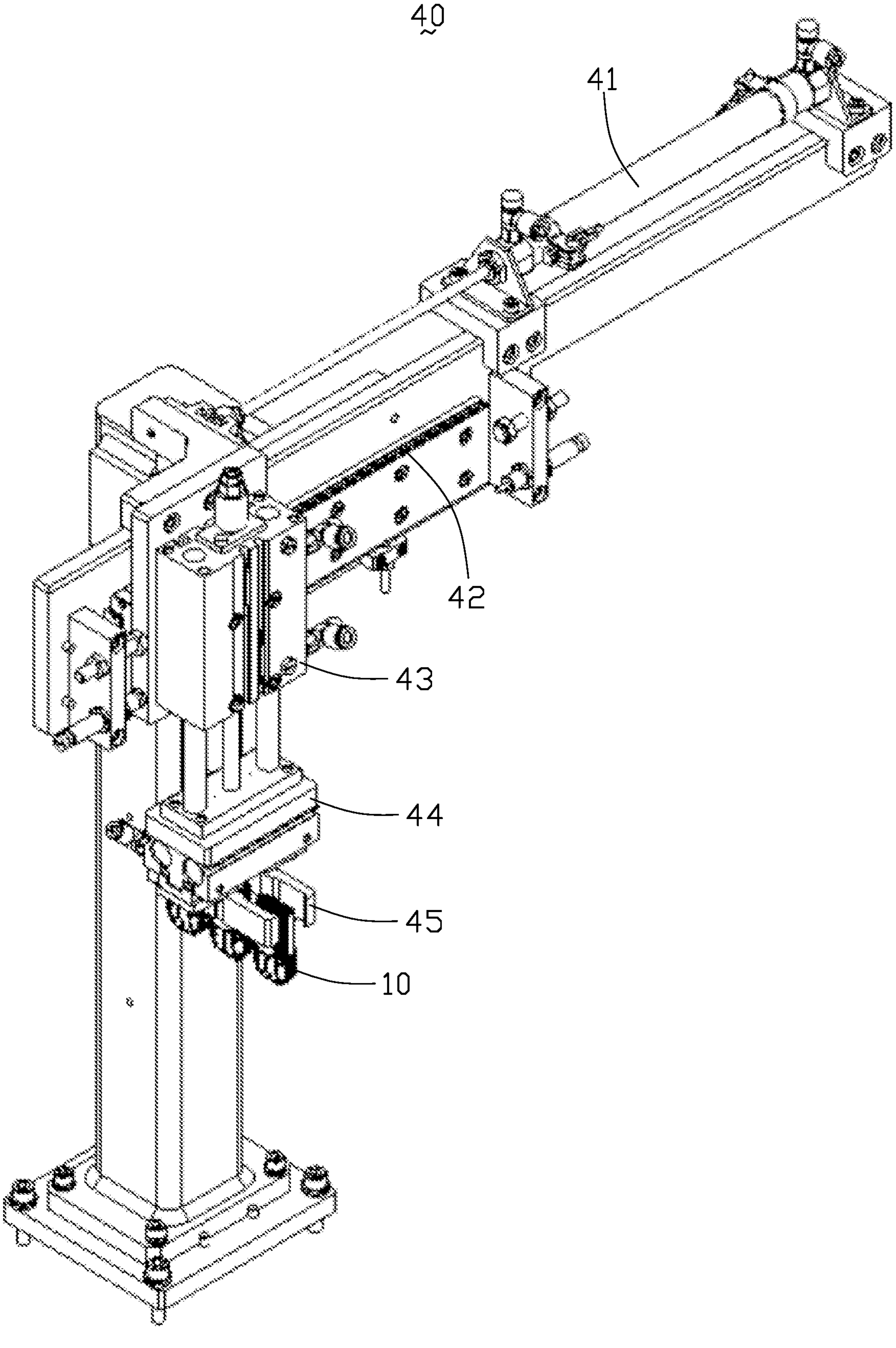
FIG. 15 is a layout diagram of the gripping and transferring mechanism of the liquid injection device shown in FIG. 10.
Figure 16:
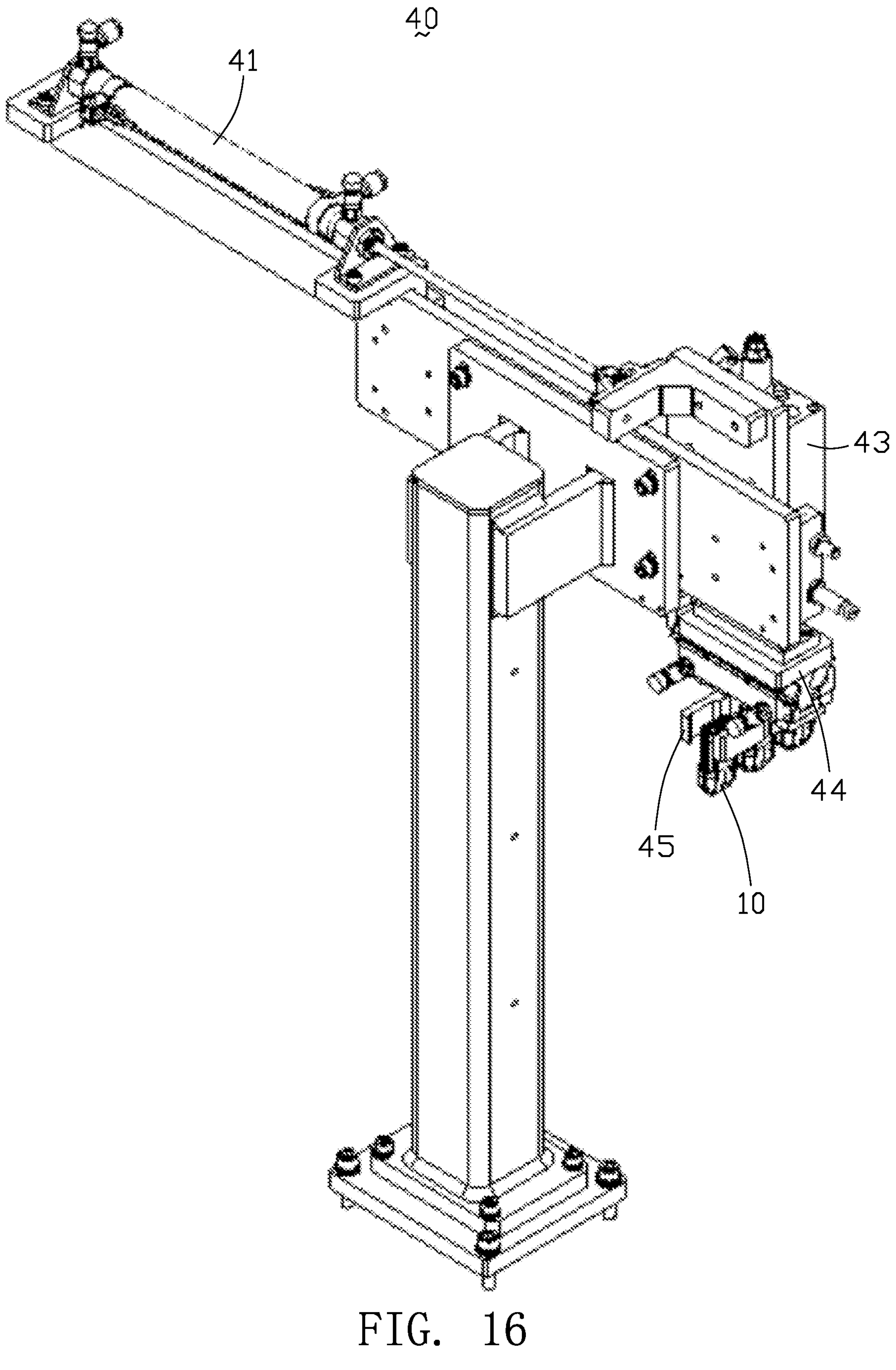
FIG. 16 is another layout diagram of the gripping and transferring mechanism of the liquid injection device shown in FIG. 10.

Specifically, referring to FIGS. 15 to 16, the gripping and transferring mechanism 40 includes a first transverse cylinder 41, a first transverse rail 42, a first vertical cylinder 43, a first pneumatic gripper 44 and a first clamping member 45. The first transverse cylinder 41 is configured to drive the first vertical cylinder 43 to move along the first transverse rail 42. The first vertical cylinder 43 is configured to drive the first pneumatic gripper 44 to move vertically. The first pneumatic gripper 44 is configured to drive the first clamping member 45. The first clamping member 45 includes two clamping arms (not labeled) that can move towards together or away from each other. The inner surface of each clamping arm is adapted to match the shape of the cartridge 10. Each clamping arm is provided with recesses (not shown) spaced apart and having the same number equal to the cartridges 10 being clamped. The distance between adjacent recesses is exactly the distance between adjacent cartridges 10 that are separated by the separating mechanism 30. The two clamping arms of the first clamping member 45 are configured to clamp the cartridges 10 from the separating mechanism 30.

The process of gripping and transferring the cartridges 10 by the gripping and transferring mechanism 40 is as follows: the pressing cylinder 35 of the separating mechanism 30 drives the pressing plate 351 to move away from directly above the limiting groove 31, the first transverse cylinder 41 of the gripping and transferring mechanism 40 drives the first vertical cylinder 43 to move along the first transverse rail 42 toward the separating mechanism 30. When the first vertical cylinder 43 moves to be directly above the limiting groove 31, the first vertical cylinder 43 drives the first pneumatic gripper 44 to move vertically downward toward the limiting groove 31. When the cartridges 10 in the limiting groove 31 enters into the two clamping arms of the first clamping member 45, the first pneumatic gripper 44 drives the two clamping arms of the first clamping member 45 to move toward each other, thereby clamping the cartridges 10 in the limiting groove 31. After the cartridges 10 are clamped, the first vertical cylinder 43 drives the first pneumatic gripper 44 to move vertically upward; and at the same time, the first transverse cylinder 41 drives the first vertical cylinder 43 to move along the first transverse rail 42 toward the conveying mechanism 50. When the first vertical cylinder 43 moves to be directly above the conveying fixture 51, the first vertical cylinder 43 drives the first pneumatic gripper 44 to move vertically downwards toward the conveying fixture 51. When the cartridges 10 clamped by the first clamping member 45 are placed into the corresponding grooves 54 in the conveying fixture 51, the first pneumatic gripper 44 drives the two clamping arms of the first clamping member 45 to move away from each other, so that the cartridges 10 are loosened and placed in the groove 54 of the conveying fixture 51.

As mentioned above, in this embodiment, there are two vibrating and feeding mechanisms 20, two separating mechanisms 30, and two gripping and transferring mechanisms 40. Each gripping and transferring mechanism 40 is configured to clamp three cartridges 10 from a corresponding separating mechanism 30, and then the cartridges 10 are transported and placed on the conveying mechanism 50.

Figure 17:
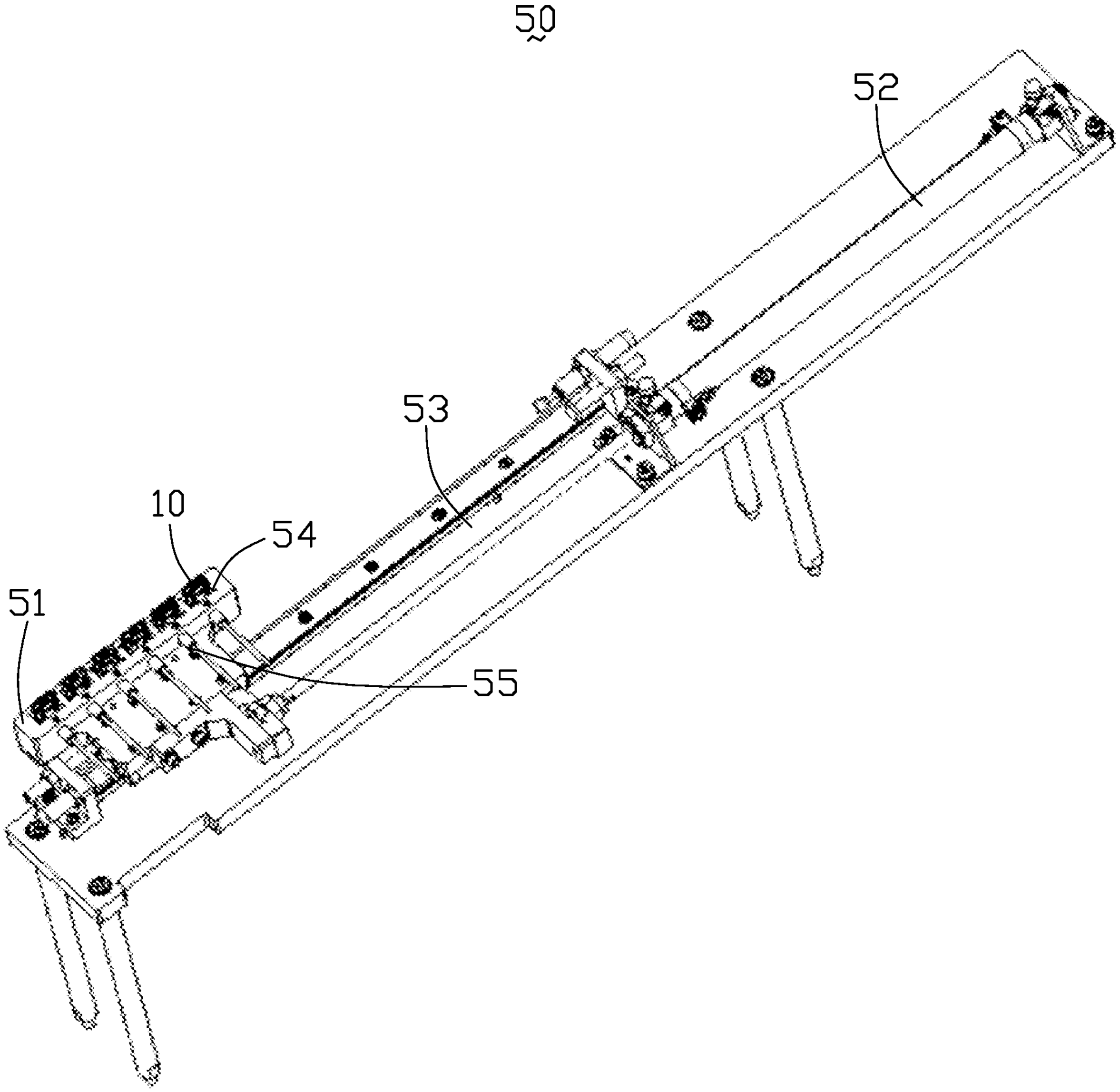
FIG. 17 is a layout diagram of the conveying mechanism of the liquid injection device shown in FIG. 10.

Specifically, referring to FIG. 17, the conveying mechanism 50 includes a conveying fixture 51, a conveying cylinder 52, and a guide rail 53. The conveying cylinder 52 is configured to drive the conveying fixture 51 to move along the guide rail 53. Two ends of the guide rail 53 are provided with limiting parts (not shown) to limit the movement stroke of the guide rail 53. A plurality of grooves 54 (six grooves in this embodiment) for placing the cartridges 10 are provided in the conveying fixture 51. The gap between the grooves 54 is exactly the distance between the cartridges 10 as separated by the separating mechanism 30. A fourth sensor 55 is installed on the side wall of each groove 54. The fourth sensor 55 is configured to detect whether there is a cartridge 10 in the groove 54. If a groove 54 is without the cartridge 10, the groove 54 without the cartridge 10 will be ignored during the subsequent liquid injection. In this embodiment, the sensor 55 is a light sensor. The gripping and transferring mechanism 40 transfers and places the clamped cartridges 10 into the grooves 54 of the conveying fixture 51, and then the conveying cylinder 52 starts to convey the conveying fixture 51 to the liquid injection mechanism 60 for liquid injection.

Figure 18:
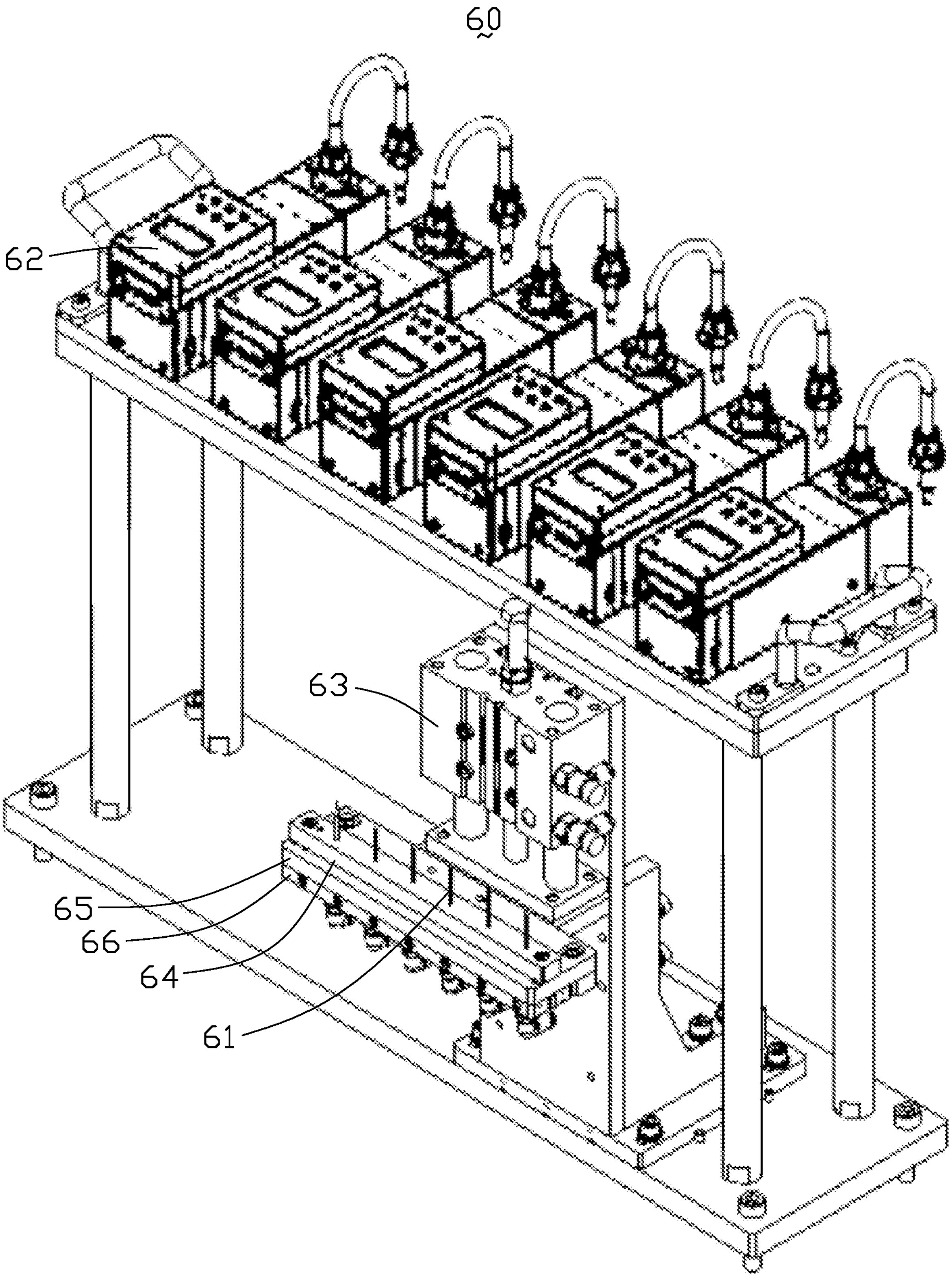
FIG. 18 is a layout diagram of the liquid injection mechanism of the liquid injection device shown in FIG. 10.
Figure 19:
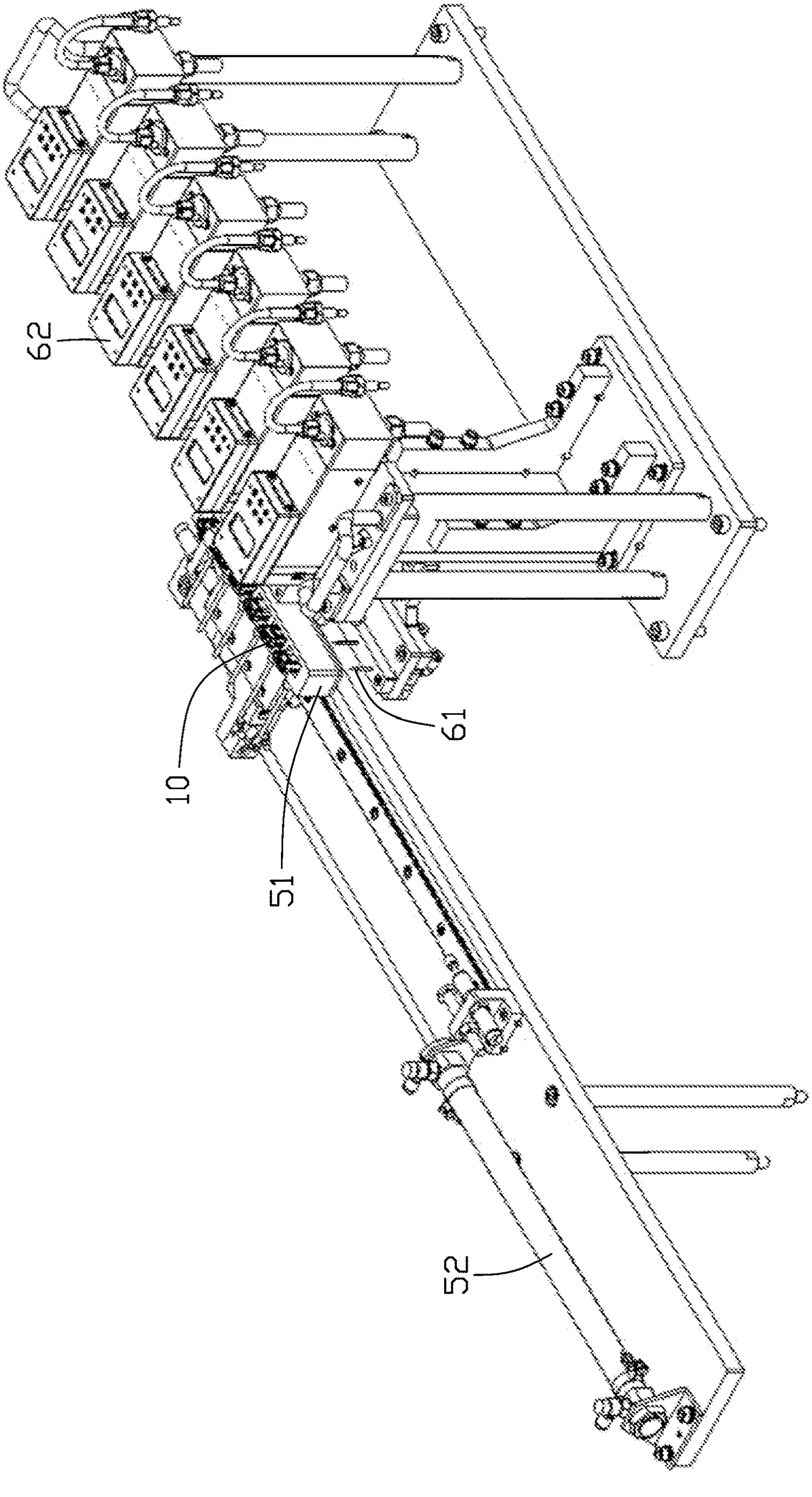
FIG. 19 is a combined layout diagram of the conveying mechanism and the liquid injection mechanism of the liquid injection device shown in FIG. 10.
Figure 20:
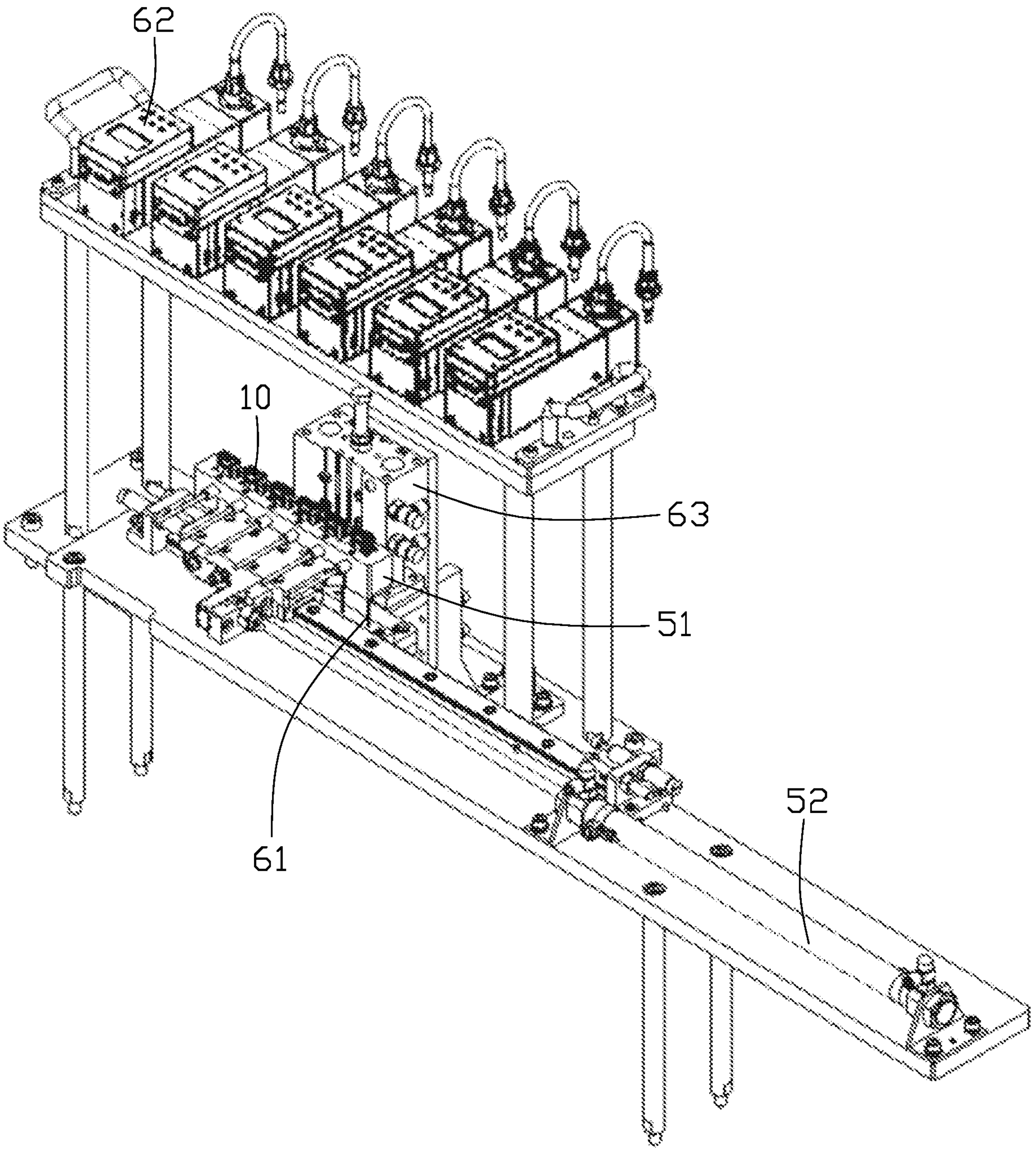
FIG. 20 is another combined layout diagram of the conveying mechanism and the liquid injection mechanism of the liquid injection device shown in FIG. 10.

Specifically, referring to FIG. 18, the liquid injection mechanism 60 includes a plurality of liquid injection needles 61 (six liquid injection needles in this embodiment), a plurality of liquid injection pumps 62 (six liquid injection pumps in this embodiment), and a driving cylinder 63. Each liquid injection needle 61 is correspondingly connected with a liquid injection pump 62. The liquid injection pump 62 may specifically be an HB (hybrid stepping motor) liquid injection pump. The HB liquid injection pump can precisely control the injection volume. The driving cylinder 63 is configured to drive the plurality of liquid injection needles 61 to move up and down.

In this embodiment, the fixing structure of the liquid injection needle 61 is a three-plate type, which includes a guiding plate 64, a fixing plate 65 and a locking plate 66 from top to bottom. The guiding plate 64 is configured to position the liquid injection needle 61 and precisely control the position of the liquid injection needle 61. A stepped hole (not shown) is defined in the fixing plate 65, and the fixing plate 65 is configured to fix the liquid injection needle 61. After unscrewing the screw to disassemble the locking plate 66 and the fixing plate 65, the liquid injection needle 61 can be taken out for cleaning. The liquid injection device can inject one type of e-liquid at a time. When the e-liquid of different compositions needs to be used, the liquid injection needle 61 and the liquid injection pump 62 need to be detached and cleaned.

Please refer to FIGS. 19-22, when the conveying mechanism 50 conveys the cartridges 10 through the conveying fixture 51 to be located above the liquid injection needles 61 of the liquid injection mechanism 60, the plurality of cartridges 10 on the conveying fixture 51 are respectively aligned one by one with the plurality of liquid injection needles 61 provided on the liquid injection mechanism 60. The driving cylinder 63 drives the liquid injection needle 61 to move upwards, the liquid injection needle 61 passes through the through hole (not shown) at the bottom of the conveying fixture 51 and then pierces the sealing member 14 of the cartridge 10 to extend into the liquid storage cavity 111; then the liquid injection pump 62 is started to perform filling the e-liquid, the liquid injection time is about 2 seconds, and the liquid injection rate is 1 ml/s. After the liquid injection is completed, the driving cylinder 63 drives the liquid injection needle 61 to move downwards, so that the liquid injection needle 61 is pulled out. After the liquid injection needle 61 is pulled out, the sealing member 14 of the cartridge 10 forms a self-sealing at the pierced position without liquid leakage.

In this embodiment, the cartridge 10 adopts inverted liquid injection. That is, the liquid injection needle 61 is inserted into the liquid storage cavity 111 of the cartridge 10 from bottom to top from the position of the sealing member 14 for liquid injection, which has at least the following technical effects: when injecting e-liquid into the liquid storage cavity 111, the air in the liquid storage cavity 111 can be discharged through the liquid absorbing member 123 and the air inlet hole 115 provided on the bottom base 113 of the cartridge housing 11 in order to balance the air pressure in the liquid storage cavity 111 and increase the liquid injection rate. Since the cartridge 10 is inverted, the liquid will fill the liquid storage cavity 111 from bottom to top under the action of gravity, and will not leak through the liquid absorbing member 123 and the air inlet hole 115 during the liquid injection process.

In addition, both the smoke outlet openings 151 provided on the top cover 15 of the cartridge 10 and the blind holes 142 provided on the sealing member 14 have two and are arranged symmetrically. During the entire liquid injection process, it is only necessary to ensure that all the cartridges 10 are kept inverted, and there is no need to distinguish the left and right directions of each cartridge 10. In this way, the position of each cartridge 10 corresponding to the liquid injection needle 61 will be a smoke outlet opening 151. Therefore, the liquid injection needle 61 can be inserted through the smoke outlet opening 151 and/or the blind hole 142 to pierce the sealing member 14.

Figure 23:
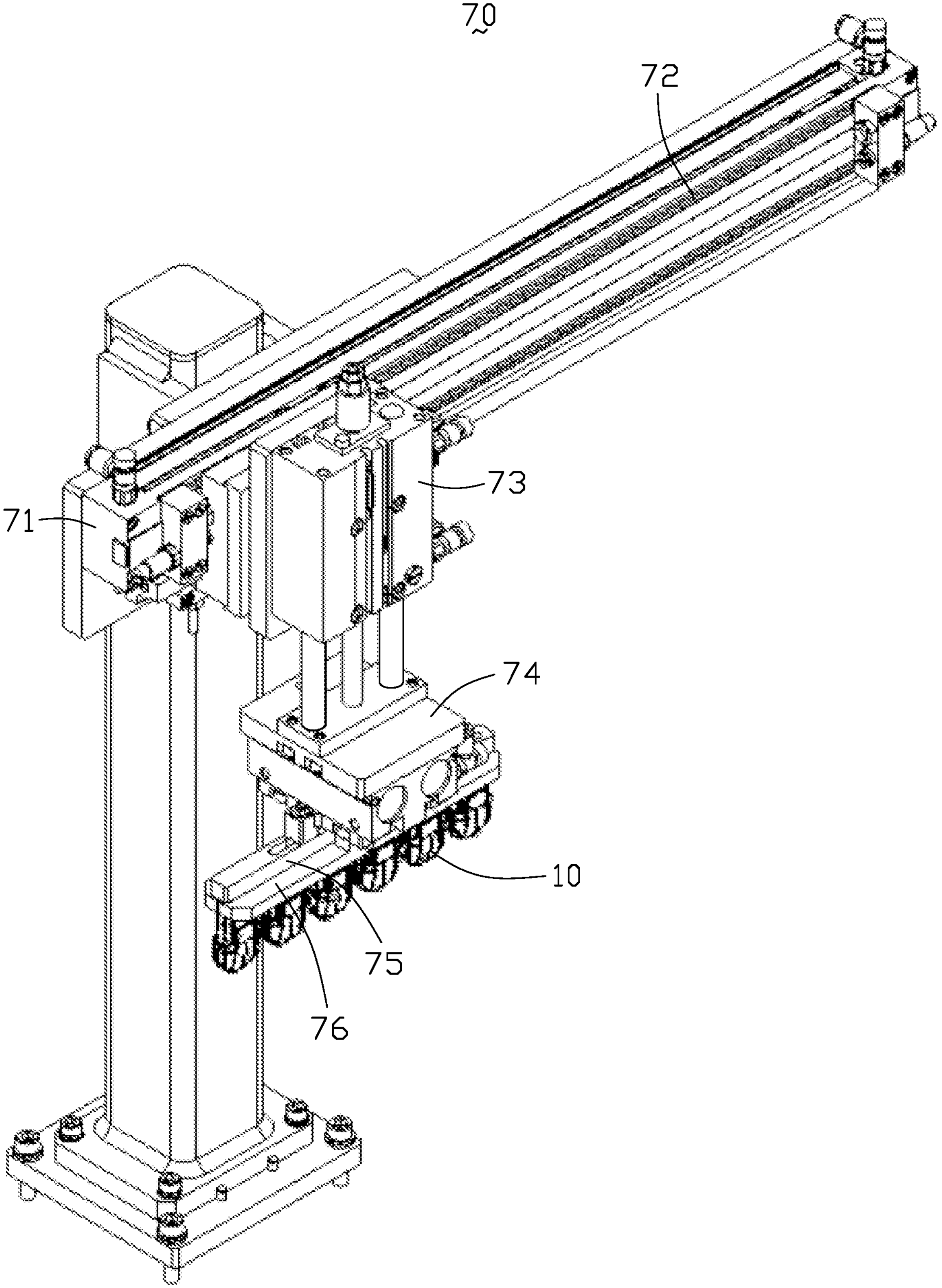
FIG. 23 is a layout diagram of the collecting mechanism of the liquid injection device shown in FIG. 10.
Figure 24:
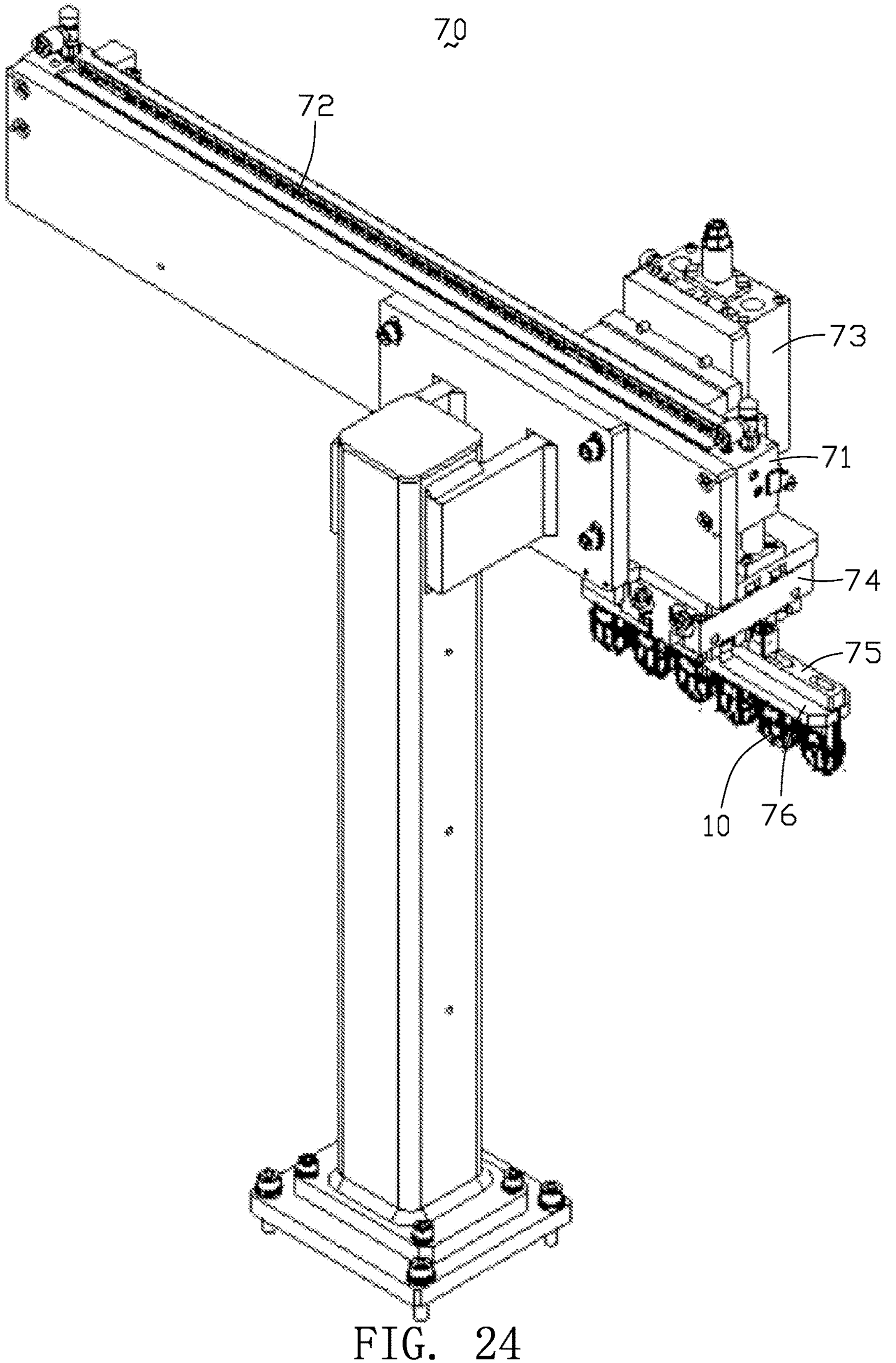
FIG. 24 is another layout diagram of the collecting mechanism of the liquid injection device shown in FIG. 10.

Specifically, please refer to FIGS. 23 to 24, the collecting mechanism 70 includes a second transverse cylinder 71, a second transverse rail 72, a second vertical cylinder 73, a second pneumatic gripper 74, a limiting plate 75, and a second clamping member 76. The second transverse cylinder 71 is configured to drive the second vertical cylinder 73 to move along the second transverse rail 72. The second transverse cylinder 71 may be a rodless cylinder. The second vertical cylinder 73 is configured to drive the second pneumatic gripper 74 to move vertically. The second pneumatic gripper 74 is configured to drive the second clamping member 76 to clamp the cartridges 10 from the conveying fixture 51. The structure and working principle of the second clamping member 76 and the first clamping member 45 are similar, and will not be repeated herein. The only difference lies in the number of the recesses. Specifically, the number of the recesses in the second clamping member 76 is six. The limiting plate 75 is connected to the lower end of the second pneumatic gripper 74, and is located between the two clamping arms of the second clamping member 76 and above the second clamping member 76.

Figure 21:
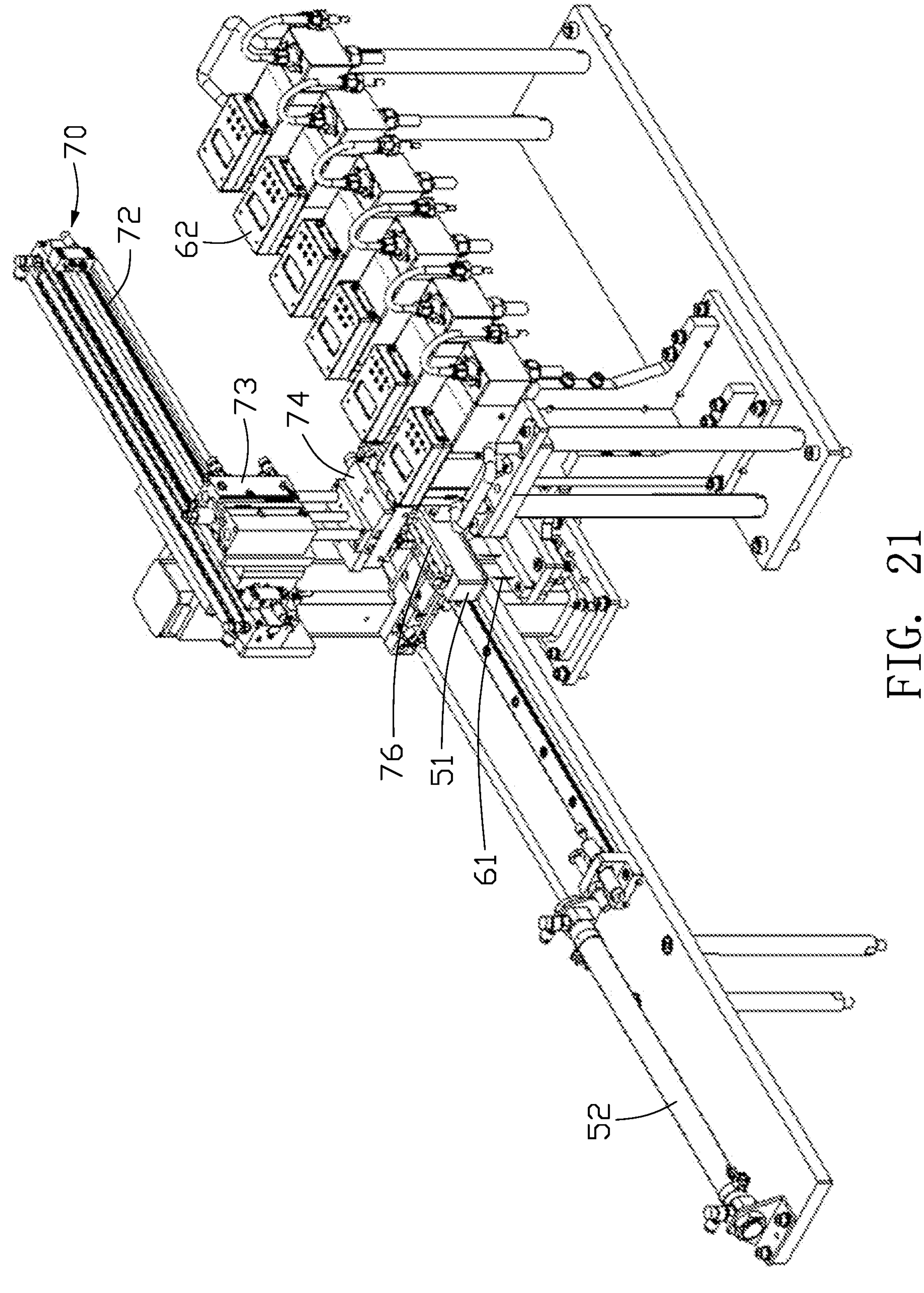
FIG. 21 is a combined layout diagram of the conveying mechanism, the liquid injection mechanism and the collecting mechanism of the liquid injection device shown in FIG. 10.
Figure 22:
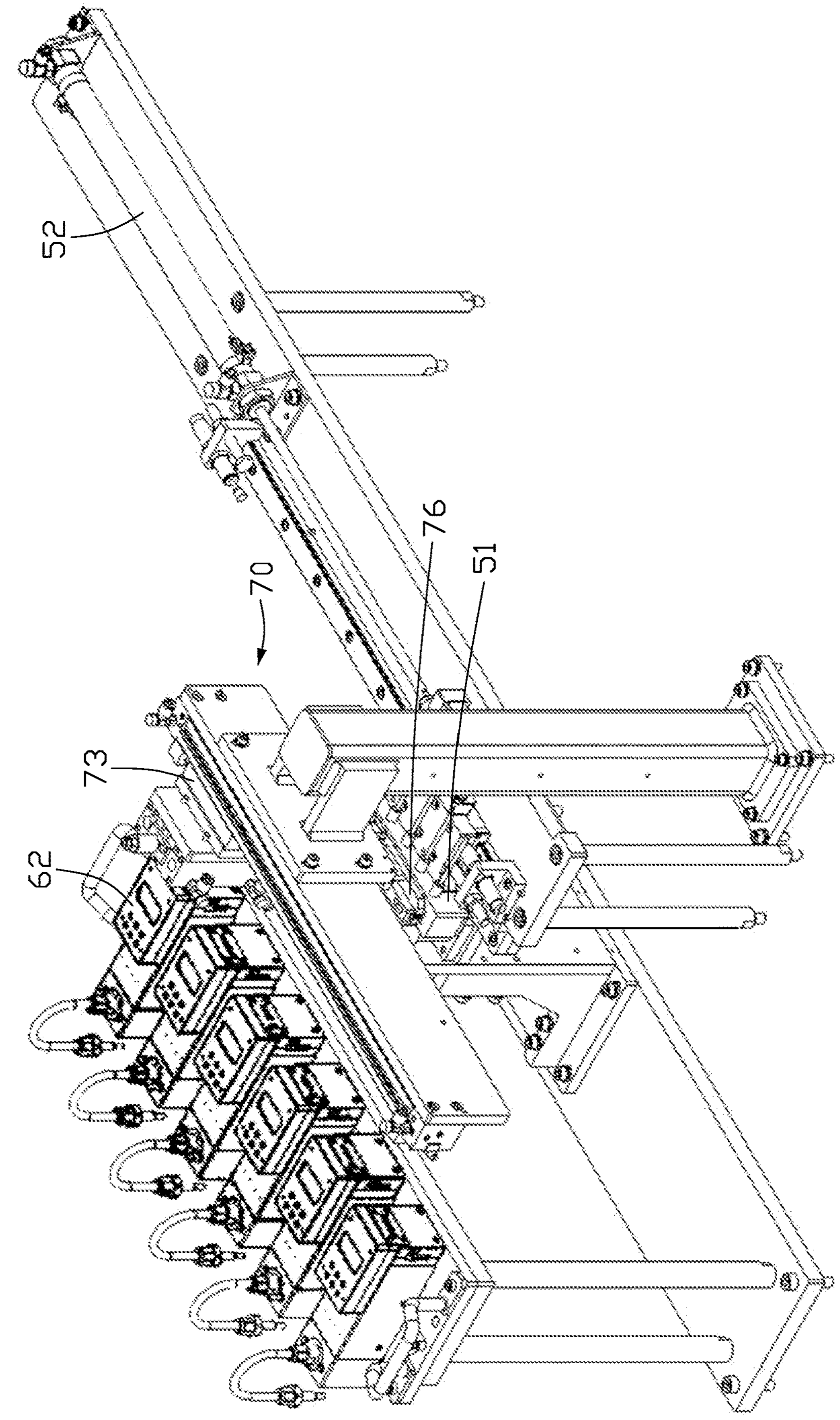
FIG. 22 is another combined layout diagram of the conveying mechanism, the liquid injection mechanism and the collecting mechanism of the liquid injection device shown in FIG. 10.

Please refer to FIGS. 21 to 22, during liquid injection, the limiting plate 75 of the collecting mechanism 70 is located above the conveying fixture 51, the limiting plate 75 abuts against the cartridge 10 in the conveying fixture 51 to prevent the cartridge 10 from moving axially when the liquid injection needle 61 is inserted into the liquid storage cavity 111. After the liquid injection is completed, the second pneumatic gripper 74 drives the two clamping arms of the second clamping member 76 to move towards each other, thereby clamping the cartridges 10 on the conveying fixture 51. After the cartridges 10 are clamped, the second vertical cylinder 73 drives the second pneumatic gripper 74 to move vertically upward; and at the same time, the second transverse cylinder 71 drives the second vertical cylinder 73 to move toward the collecting mechanism 70 along the second transverse rail 72. After the second vertical cylinder 73 moves to be directly above the collecting mechanism 70, the second vertical cylinder 73 drives the second pneumatic gripper 74 to move vertically downwards toward the collecting mechanism 70. When the cartridges 10 clamped by the second clamping member 76 are placed into the collecting mechanism 70, the second pneumatic gripper 74 drives the two clamping arms of the second clamping member 76 to move away from each other, so that the cartridges 10 are loosened and placed in the collecting mechanism 70.

Figure 25:
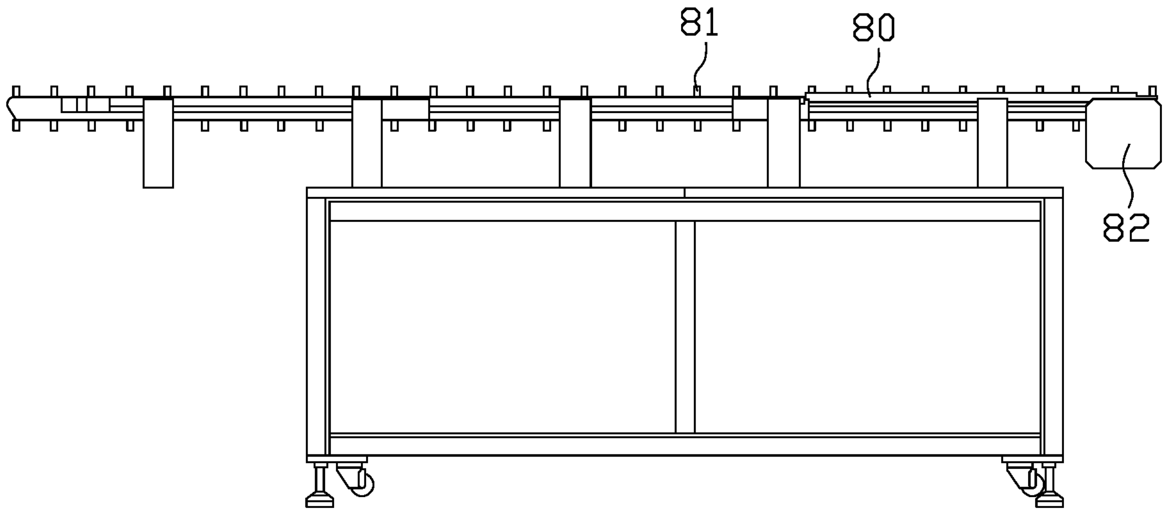
FIG. 25 is a layout diagram of the conveyor belt of the liquid injection device shown in FIG. 10.
Figure 26:
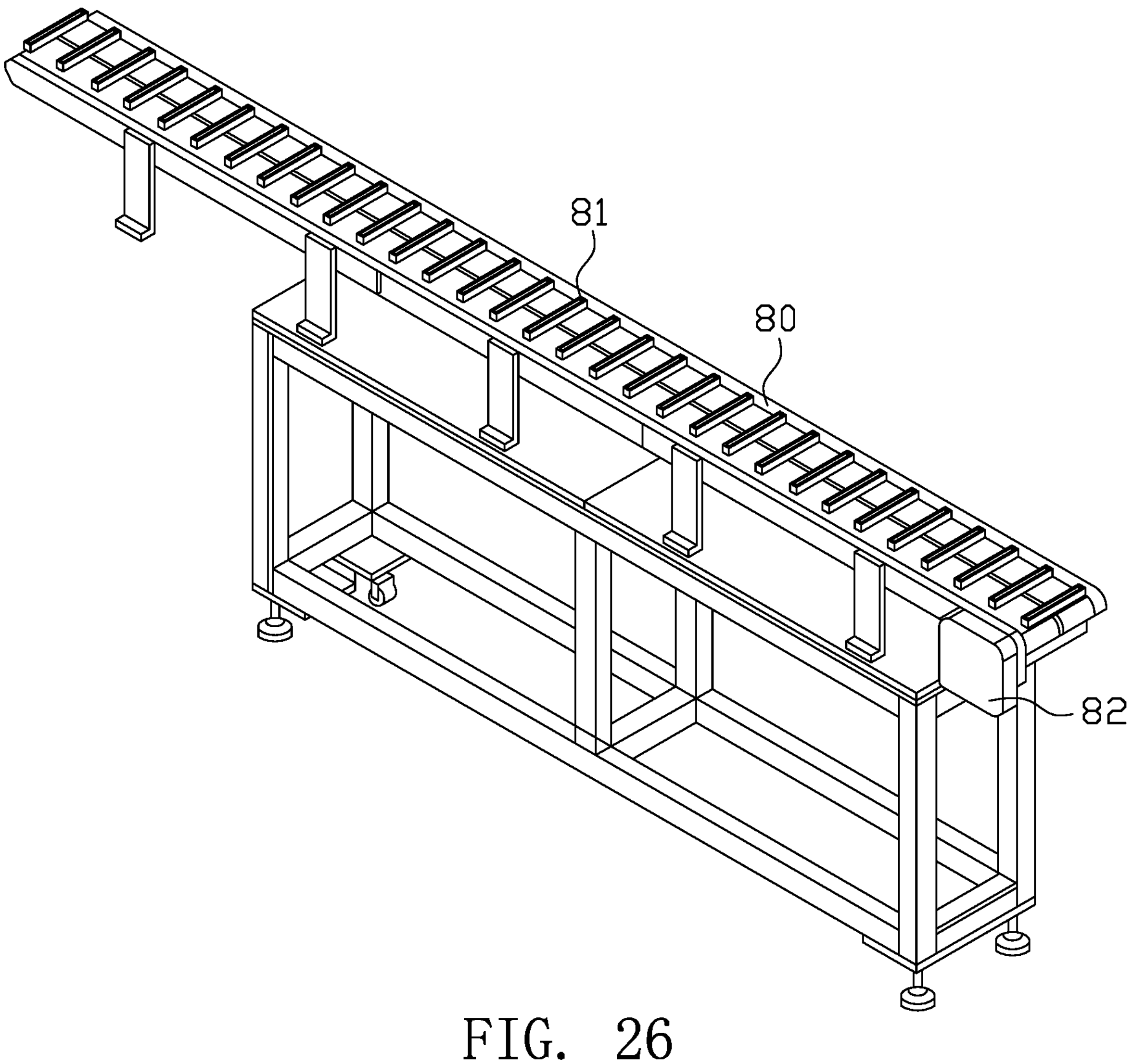
FIG. 26 is another layout diagram of the conveyor belt of the liquid injection device shown in FIG. 10.

Specifically, referring to FIGS. 25 to 26, in this embodiment, the collecting mechanism 70 is configured to receive the liquid-filled cartridges 10 onto a conveyor belt 80. The conveyor belt 80 is provided with a plurality of collecting fixtures 81 arranged in parallel, and each collecting fixture 81 is provided with a plurality of grooves (not labeled) (six grooves in this embodiment) for placing the cartridges 10. The collecting mechanism 70 clamps the liquid-filled cartridges 10 from the conveying fixture 51 and transfers them to the conveyor belt 80; then, the cartridges 10 are placed in the grooves of the collecting fixture 81, so that the protective cover 16 can be covered manually or by a machine. The protective cover 16 has a temporary protective function. When the user uses the cartridge 10, the protective cover 16 can be removed.

The conveyor belt 80 can be driven by an HB (hybrid stepping motor) motor 82, the HB motor 82 drives the conveyor belt 80 to move accurately. The HB motor 82 drives the conveyor belt 80 to move, and the empty collecting fixture 81 is moved to the collecting position and waits for the collecting mechanism 70 to place the liquid-filled cartridge 10 onto it.

The cartridge, the liquid injection method and the liquid injection device provided in this embodiment can first assemble the atomizing head, the vent pipe and the sealing member into the cartridge housing. After the assembly is completed, the sealing member is pierced through the liquid injection needle to inject the e-liquid into the liquid storage cavity. After the liquid injection is completed, the liquid injection needle is pulled out, and the sealing member forms a self-sealing at the pierced position, which can effectively avoid the problem of liquid leakage when the atomizing head is assembled after the e-liquid is injected, and the difficulty of injecting liquid into the cartridge can be greatly reduced, thereby improving the production efficiency.

The above-mentioned embodiments are only the embodiments of the present disclosure and are not used to limit the implementation and scope of the present disclosure. All equivalent changes and modifications made according to the content described in the present disclosure shall be included in the scope of protection of the present disclosure.

What is claimed is:

1. A liquid injection method for injecting liquid into a cartridge of an electronic cigarette, wherein the cartridge comprises a cartridge housing, an atomizing head and a sealing member; a liquid storage cavity for storing e-liquid is formed inside the cartridge housing; the atomizing head is arranged at a lower end of the cartridge housing, the sealing member is arranged at an upper end of the cartridge housing opposite to the atomizing head; the atomizing head is in communication with the liquid storage cavity and the outside; wherein the liquid injection method comprises:

inverting the cartridge;

using a liquid injection needle to pierce the sealing member of the cartridge and extend into the cartridge housing to inject e-liquid into the liquid storage cavity of the cartridge; and after the liquid injection is completed, pulling out the liquid injection needle, and the sealing member forming a self-sealing at the pierced position;

wherein the liquid injection method further comprises:

after the cartridge is inverted, the cartridge is conveyed and fed towards the position of the liquid injection needle by means of vibration;

during conveying and feeding, a plurality of cartridges abutting against with each other at the front end are separated so that the plurality of cartridges are separated from each other; and the plurality of cartridges having been separated from each other are gripped and transferred to the liquid injection position, to cause the plurality of cartridges to be aligned with a plurality of liquid injection needles respectively, so that the plurality of liquid injection needles are used to inject e-liquid into the plurality of cartridges respectively.

2. The liquid injection method according to claim 1, wherein the liquid injection method further comprises:

the plurality of cartridges having been separated from each other are gripped and transferred to a conveying fixture for placement; and the conveying fixture with the plurality of cartridges are transferred to the liquid injection position.

3. The liquid injection method according to claim 1, wherein the liquid injection needle is driven to move up to pierce the sealing member of the cartridge and extend into the cartridge housing.

* * * * *